(12) United States Patent
Tanaka

(10) Patent No.: US 6,499,117 B1
(45) Date of Patent: Dec. 24, 2002

(54) NETWORK FAULT INFORMATION MANAGEMENT SYSTEM IN WHICH FAULT NODES ARE DISPLAYED IN TREE FORM

(75) Inventor: Katsuyuki Tanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/480,113

(22) Filed: Jan. 10, 2000

(30) Foreign Application Priority Data

Jan. 14, 1999 (JP) .......................................... 11-008553

(51) Int. Cl.[7] ................................................ G06F 11/00
(52) U.S. Cl. .......................... 714/49; 709/223; 709/226
(58) Field of Search ............................. 714/49, 52, 57, 714/56, 47, 48, 43, 25, 26, 39; 709/223, 226, 220

(56) References Cited

U.S. PATENT DOCUMENTS

| | | | | |
|---|---|---|---|---|
| 5,448,724 A | * | 9/1995 | Hayashi .................. | 395/182.02 |
| 6,006,016 A | * | 12/1999 | Faigon et al. .......... | 395/185.01 |
| 6,026,442 A | * | 2/2000 | Lewis et al. ................. | 709/229 |
| 6,253,339 B1 | * | 6/2001 | Tse et al. ....................... | 714/47 |
| 6,308,282 B1 | * | 10/2001 | Huang et al. ................... | 714/4 |
| 6,321,081 B1 | * | 11/2001 | Lee ............................. | 455/422 |
| 6,324,577 B1 | * | 11/2001 | Hirai .......................... | 709/223 |

FOREIGN PATENT DOCUMENTS

| | | |
|---|---|---|
| JP | 2-301895 | 12/1990 |
| JP | 5-33692 | 2/1993 |
| JP | 6-141029 | 5/1994 |
| JP | 6-205007 | 7/1994 |
| JP | 7-143123 | 6/1995 |
| JP | 7-200499 | 8/1995 |

\* cited by examiner

Primary Examiner—Nadeem Iqbal
(74) Attorney, Agent, or Firm—Sughrue Mion, PLLC

(57) ABSTRACT

A network fault managing system for a network including network elements as nodes includes a fault node indication data storage section, a fault indication data storage section, a flag, a fault node indication data processing section, a fault indication data processing section and an output unit. The fault node indication data storage section stores a fault node indication data set in which fault nodes are managed in a tree form. The fault node indication data processing section receives a fault association notice having a fault occurrence position identifier and a fault indication data, the fault occurrence position identifier indicating a fault node in which a fault has occurred, and the fault indication data indicating data associated with the fault, and determines whether a fault node indication data corresponding to the fault node specified by the fault occurrence position identifier of the fault association notice is present in the fault node indication data set. Also, the fault node indication data processing section generates the fault node indication data based on the fault occurrence position identifier to store in the fault node indication data set of the fault node indication data storage section, when the fault node indication data is not present in the fault node indication data set, and sets the flag.

23 Claims, 16 Drawing Sheets

NETWORK FAULT INFORMATION MANAGEMENT SYSTEM IN WHICH FAULT NODES ARE DISPLAYED IN TREE FORM

BACKGROUND OF THE INVENTION

1. Field of the Invention

The present invention relates to a network management system. More particularly, the present invention is directed to a network management system to manage the state of a fault network element and to notify a fault occurrence location in a large-scale communication network.

2. Description of the Related Art

An conventional example of a network fault management system will be described in Japanese Laid Open Patent Application (JP-A-Heisei 5-33692). According to the system described in this reference, the state of a fault is checked based on a structure data of a tree form. That is, a knowledge base is previously prepared to store a fault diagnostic tree in which nodes represent various fault states. The fault diagnostic tree is traced based on fault data received from an apparatus in which any fault has occurred, to specify a kind of the fault.

Also, in the large-scale network, distribution management is generally used for the network fault management system. In the distribution management system, fault data is displayed for every distributed network management system. The fault data indicative of a fault which has occurred in the network is individually stored in the network management system in the order of occurrence of the fault. The fault data are displayed in a table form and are displayed in a graphic form, using the structure diagram of network elements. Instead, the apparatus in which the fault has occurred is displayed with a different color from normal apparatuses on the map showing the network structure.

In the network fault data management system described above, the fault can be specified using the fault diagnostic tree. However, the processing for specifying a fault occurrence location is not considered.

Also, for example, in the distributed network management system, the fault occurrence apparatus can be displayed on the network configuration screen. However, it is not possible to show what fault occurs where in the apparatus on the same screen. For this reason, the operator needs to change a control to the network management system which manages the fault occurrence apparatus and to change a display screen to the fault data screen of the apparatus. Especially, when a plurality of faults which have occurred in a plurality of network management systems should be displayed, the number of times of the changing operation of the display screen increases. Moreover, the fault data is dynamic, and generally, the occurrence and restoration of the faults are repeated in the large-scale network. Therefore, in the conventional fault data management system, the load of the operator becomes heavy.

In the conventional large scale network fault management system, it is this difficult for the operator who manages the network to grasp the occurrence locations of all faults which have occurred in the system and the states of the faults.

In conjunction with the above description, a large scale alarm display system is described in Japanese Laid Open Patent Application (JP-A-Heisei 2-301895). In this reference, the large scale alarm display system is composed of a network management system and a network alarm display unit. The network management system receives alarm information from each of network elements of the large scale network. Then, network management system carries out a display control of the alarm information from a level indicative of alarm contents of the whole large scale network to alarm contents of the network element as a minimum component of the network for every layer. The network alarm display unit receives the output of the network management system to display the alarm information.

Also, a network structure display system is described in Japanese Laid Open Patent Application (JP-A-Heisei 6-205007). In this reference, a station (ST2) and branch units (BB1 and BB2) which are connected to a component control unit (DU1) are displayed on a ring (16a). A network management unit (SGM) connected to the branch unit (BB1) and a station (ST1) connected to the branch unit (BB2) are displayed on rings (17a and 17b), respectively. The structure is determined by referring to a physical connection form and by detecting a logical connection order, and then is displayed on a CRT.

Also, a communication network fault display system is described in Japanese Laid Open Patent Application (JP-A-Heisei 6-141029). In this reference, a summary screen/a portion screen of a fault and a warning sound are determined based on programs (106 to 109) stored in a program memory (110) using a display information data base (104) which stores a network map group and relation of communication network elements and display data. The determined screen group is automatically displayed on a CRT (111), and a buzzer sound is outputted from a buzzer sound outputting unit (114). Thus, in a network management display system, the screen group indicating the whole states and details of the fault is automatically determined and displayed to quickly inform to an operator.

Also, a communication network monitoring system is described in Japanese Laid Open Patent Application (JP-A-Heisei 7-143123). In this reference, the network monitoring system collects fault alarms of components of a communication network to display on a hierarchical monitor screen. In this case, the fault alarms notified from the components of the communication network are classified for each of display elements on the monitor screen, and fault information related with the fault alarm is displayed in neighborhood of the relating display element. Thus, the fault alarm can be related with the corresponding display element in an upper level network map.

Also, a fault diagnosis apparatus is described in Japanese Laid Open Patent Application (JP-A-Heisei 7-143123). In this reference, a central processing unit (2) is connected with an input unit (3), a display unit (4), and a storage unit (1), and is composed of a diagnosis unit (20) for diagnosing a fault. A plurality of diagnosis data are stored in the storage unit (1) in correspondence to fault states, respectively. The diagnosis unit (20) is composed of a diagnosis tree selecting section (21), a testing section (22), a diagnosis tree designating section (21) and a test result determining section (23). The diagnosis tree selecting section (21) selects a diagnosis tree and a node relating to a fault to be handled from among nodes indicative of the fault states stored in a knowledge base (11). The testing section (22) tests in accordance with the content of the selected node. The test result determining section (23) selects the node having the highest probability from among the nodes indicative of the fault states and informs it to the diagnosis tree designating section (21) and controls the display unit (4) to display it.

Also, a fault diagnosis apparatus is described in Japanese Laid Open Patent Application (JP-A-Heisei 7-200499). In this reference, a central processing apparatus (2) is connected with an input unit (3), a display unit (4) and a storage unit (1). The central processing apparatus (2) is provided with a diagnosis unit (20). A plurality of diagnosis data are stored in the storage unit (1) in correspondence to fault states, respectively. The diagnosis unit (20) is composed of a diagnosis tree selecting section (21), a diagnosing section (22), a diagnosing result determining section (23). The diagnosis tree selecting section (21) selects nodes related to a fault to be measured from among nodes of the diagnosis tree of a knowledge base (11) stored in the storage unit (1). The diagnosing section (22) carries out the diagnosis based on the content defined in each of the selected nodes. The diagnosing result determining section (23) specifies the node indicating the fault state with the highest probability from among the selected nodes based on the diagnosis results and controls the display unit (4) to display the specified node and the related data.

SUMMARY OF THE INVENTION

Therefore, an object of the present invention is to provide the technique for specifying the occurrence locations of faults which have occurred in a network and the fault classification.

Another object of the present invention is to provide the technique for dynamically managing fault data which dynamically changes.

In order to achieve an aspect of the present invention, a method of managing faults on a network including network elements as nodes, is attained by receiving a fault association notice having a fault occurrence position identifier and a fault data, the fault occurrence position identifier indicating a fault node in which a fault has occurred, and the fault data indicating a data associated with the fault. Then, the method is attained by determining whether any fault node indication data corresponding to the fault node specified by the fault occurrence position identifier of the fault association notice is present in a fault node indication data set in a tree form, and by generating a fault node indication data based on the fault occurrence position identifier to add to the fault node indication data set in the tee form, when any fault node indication data corresponding to the fault node specified by the fault occurrence position identifier is not present in a fault node indication data set. In addition, the method is attained by determining whether any fault indication data corresponding to the fault node indication data is present in a fault indication data set, the fault indication data indicating a type of the fault, and generating a fault indication data corresponding to the fault node indication data based on the fault data to add to the fault indication data set, when the fault indication data corresponding to the fault node indication data is not present in the fault indication data set. The method is attained by displaying the fault node indication data set in the tree form and the fault indication data set in response to the fault association notice or a display instruction.

Here, the fault data of the fault association notice may include a restoration data indicating that the fault has been restored. At this time, the method may be attained by deleting the fault node indication data corresponding to the fault association notice from the fault node indication data set and the fault indication data corresponding to the fault association notice from the fault indication data set in response to the restoration data of the fault association notice. In this case, the fault data of the fault association notice may include an fault importance level indicating whether the fault is important, and the fault indication data includes a fault importance indication data. At this time, the method may be attained by updating the fault importance indication data of the fault indication data corresponding to the fault node specified by the fault occurrence position identifier of the fault association notice based on the fault importance level, when the fault node indication data and the fault indication data are not generated and the fault data of the fault association notice does not include the restoration data.

Also, in the generating a fault node indication data, a first display indication data corresponding to the fault node specified by the fault occurrence position identifier may be generated, the first display indication data including a symbol. In the generating a fault indication data, a second display indication data for the fault indication data corresponding to the fault node specified by the fault occurrence position identifier may be generated, the second display indication data including a character string. At this time, in the displaying, the fault node indication data set in the tree form and the fault indication data set are displayed based on the first and second display indication data in response to the fault association notice or the display instruction.

Also, in the generating a fault node indication data, a first display indication data corresponding to the fault node specified by the fault occurrence position identifier may be generated, the first display indication data including a symbol. In the generating a fault indication data, a second display indication data for the fault indication data corresponding to the fault node specified by the fault occurrence position identifier may be generated, the second display indication data including a character string. At this time, in the deleting, the first and second display indication data respectively corresponding to the fault node indication data and the fault indication data are deleted. Also, In the displaying, the fault node indication data set in the tree form and the fault indication data set is displayed based on the first and second display indication data in response to the fault association notice or the display instruction, and the fault node indication data set in the tree form of the fault nodes from which the fault node is deleted is displayed.

Also, in the generating the fault node indication data, a first display indication data corresponding to the fault node specified by the fault occurrence position identifier may be generated, the first display indication data including a symbol. In the generating the fault indication data, a second display indication data for the fault indication data corresponding to the fault node specified by the fault occurrence position identifier may be generated, the second display indication data including a character string. In the updating, the second display indication data corresponding to the fault node specified by the fault occurrence position identifier of the fault association notice may be updated based on the fault importance level, when the fault node indication data and the fault indication data are not generated and the fault indication data of the fault association notice does not include the restoration data. At this time, in the displaying, the tree form of the fault nodes and the data associated with the fault are displayed based on the first and second display indication data in response to the fault association notice or the display instruction, and the tree form of the fault nodes in one of which the fault importance level is updated is displayed.

Also, the fault node indication data of the fault node has an address to a list of parent node addresses corresponding to a parent node, an address to a list of child node addresses which designate child nodes connected to the fault node, and a list of fault indication data addresses which designate the fault indication data.

Also, in the generating the fault node indication data, a new data generation flag may be set when the fault node indication data is generated. In the determining whether a fault indication data corresponding to the fault node indication data is present in a fault indication data set, the new data generation flag is checked to determine whether a fault indication data corresponding to the fault node indication data is present in a fault indication data set.

In order to achieve another aspect of the present invention, a network fault managing system for a network including network elements as nodes, includes a fault node indication data storage section, a fault indication data storage section, a flag, a fault node indication data processing section, a fault indication data processing section and an output unit. The fault node indication data storage section stores a fault node indication data set in which fault nodes are managed in a tree form. The fault node indication data processing section receives a fault association notice having a fault occurrence position identifier and a fault indication data, the fault occurrence position identifier indicating a fault node in which a fault has occurred, and the fault indication data indicating data associated with the fault, and determines whether a fault node indication data corresponding to the fault node specified by the fault occurrence position identifier of the fault association notice is present in the fault node indication data set. Also, the fault node indication data processing section generates the fault node indication data based on the fault occurrence position identifier to store in the fault node indication data set of the fault node indication data storage section, when the fault node indication data is not present in the fault node indication data set, and sets the flag. The fault indication data processing section determines based on the flag, whether a fault indication data corresponding to the fault node indication data is present in a fault indication data set, the fault indication data indicating a type of the fault, and generates the fault indication data based on the fault indication data to store in fault indication data set of the fault indication data set, when the fault indication data corresponding to the fault node indication data is not present in the fault indication data set. The output unit outputs the fault node indication data set in the tree form and at least a part of the fault indication data set.

Here, the fault indication data of the fault association notice may include a restoration data indicating that the fault has been restored. At this time, the fault node indication data processing section deletes the fault node indication data from the fault node indication data set in response to the restoration data of the fault association notice. The fault indication data processing section deletes the fault indication data from the fault indication data set in response to the restoration data of the fault association notice.

Also, the fault indication data of the fault association notice may include an fault importance level indicating whether the fault is important, and the fault indication data includes a fault importance indication data. In this case, the fault indication data processing section updates the fault importance indication data of the fault indication data corresponding to the fault node specified by the fault occurrence position identifier of the fault association notice based on the fault importance level, when the fault node indication data and the fault indication data are not generated and the fault indication data of the fault association notice does not include the restoration data.

Also, the fault node indication data processing section may generate a first display indication data corresponding to the fault node specified by the fault occurrence position identifier, the first display indication data including a symbol. At this time, the fault indication data processing section generates a second display indication data for the fault indication data corresponding to the fault node specified by the fault occurrence position identifier, the second display indication data including a character string. The output unit outputs the tree form of the fault nodes and a data associated with the fault based on the first and second display indication data in response to the fault association notice or the display instruction.

Also, the fault node indication data processing section generates a first display indication data corresponding to the fault node specified by the fault occurrence position identifier, the first display indication data including a symbol, and deletes the first and second display indication data respectively corresponding to the fault node indication data. At this time, the fault indication data processing section generates a second display indication data for the fault indication data corresponding to the fault node specified by the fault occurrence position identifier, the second display indication data including a character string, deleting the first and second display indication data respectively corresponding to the fault node indication data and the fault indication data, and deletes the fault indication data corresponding to the fault node indication data. The output unit outputs the tree form of the fault nodes and a data associated with the fault based on the first and second display indication data in response to the fault association notice or the display instruction, and outputs the tree form of the fault nodes from which the fault node is deleted.

Also, the fault node indication data processing section may generate a first display indication data corresponding to the fault node specified by the fault occurrence position identifier, the first display indication data including a symbol. At this time, the fault indication data processing section generates a second display indication data for the fault indication data corresponding to the fault node specified by the fault occurrence position identifier, the second display indication data including a character string. Also, the fault indication data processing section updates the second display indication data corresponding to the fault node specified by the fault occurrence position identifier of the fault association notice based on the fault importance level, when the fault node indication data and the fault indication data are not generated and the fault indication data of the fault association notice does not include the restoration data. The output unit outputs the tree form of the fault nodes and the data associated with the fault based on the first and second display indication data in response to the fault association notice or the display instruction, and outputs the tree form of the fault nodes in one of which the fault importance level is updated.

Also, the fault node indication data of the fault node may have an address of a list of parent node addresses corresponding to a parent node, an address to a list of child node addresses which designate child nodes connected to the fault node, and a list of fault indication data addresses which designate the fault indication data.

In order to achieve still another aspect of the present invention, a computer-readable recording medium in which a program is stored to execute the above-mentioned methods of managing faults on a network including network elements as nodes.

DESCRIPTION OF THE PREFERRED EMBODIMENTS

Hereinafter, a network fault data management system of the present invention will be described below in detail with reference to the attached drawings. It should be noted that the network fault data management system may be executed by a computer controlled based on a program in the following description. The program is provided in a recording medium. As the recording medium, any recording medium can be used such as a magnetic disk, a semiconductor memory, and another optional medium which can be read by a computer. However, the present invention is not limited to the computer control.

First Embodiment

Figure 1:
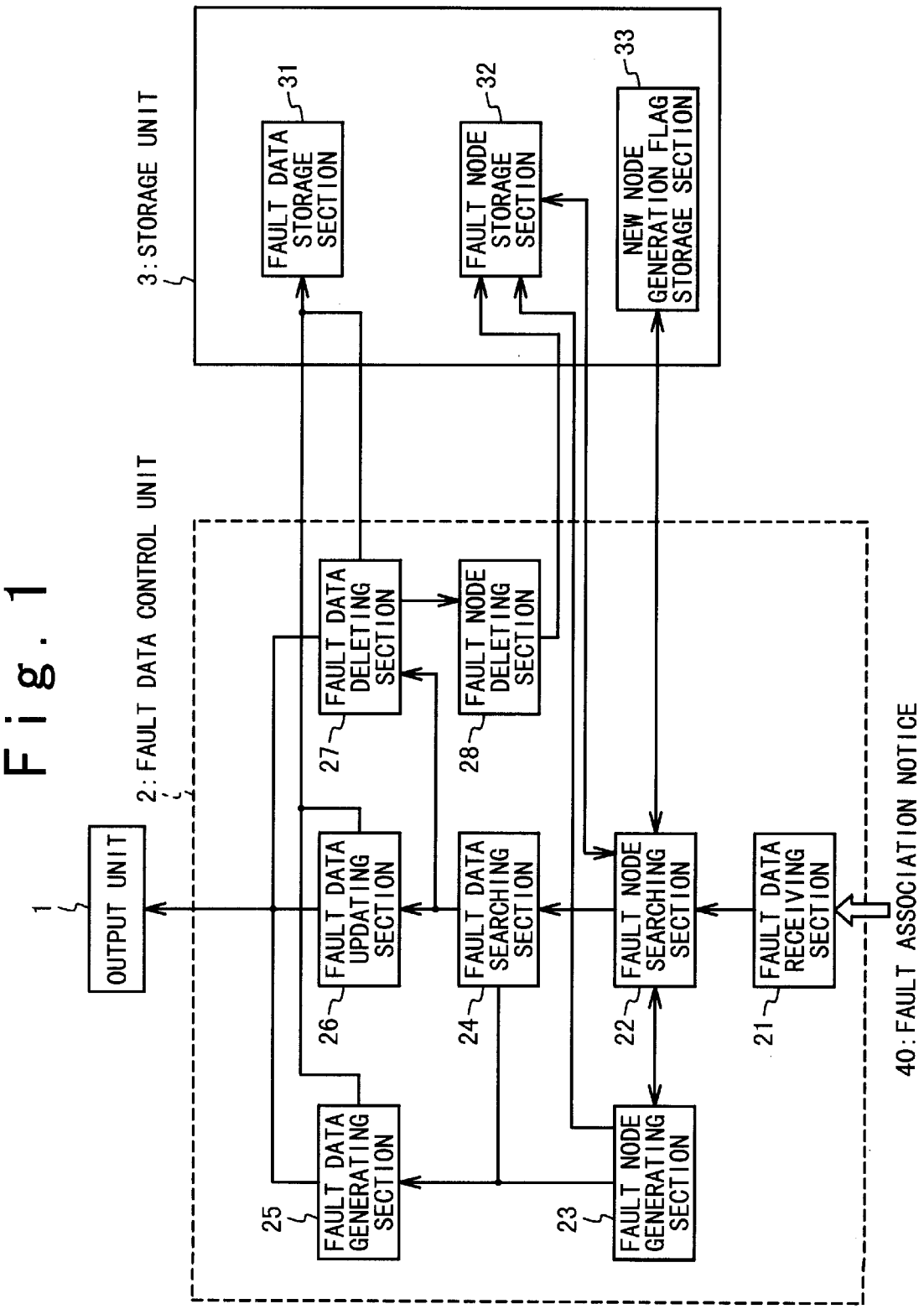
FIG. 1 is a functional block diagram showing a network fault data management system of a first embodiment of the present invention.

First, referring to FIG. 1, the network fault management system according to the first embodiment of the present invention will be described. As shown in FIG. 1, the network fault data management system in the first embodiment is composed of an output unit 1, a fault data control unit 2 and a the storage unit 3. The output unit is such as a display unit and/or a printer to output fault data in a tree form. The fault data control unit 2 operates based on a program control. The storage unit 3 stores data.

(Storage)

As shown in FIG. 1, the storage unit 3 is composed of a fault data storage section 31, a fault node storage section 32 operating an instruction or a fault association notice, and a new node generation flag storage section 33. The fault association notice is composed of a fault occurrence node identifier and a fault data.

Figure 2:
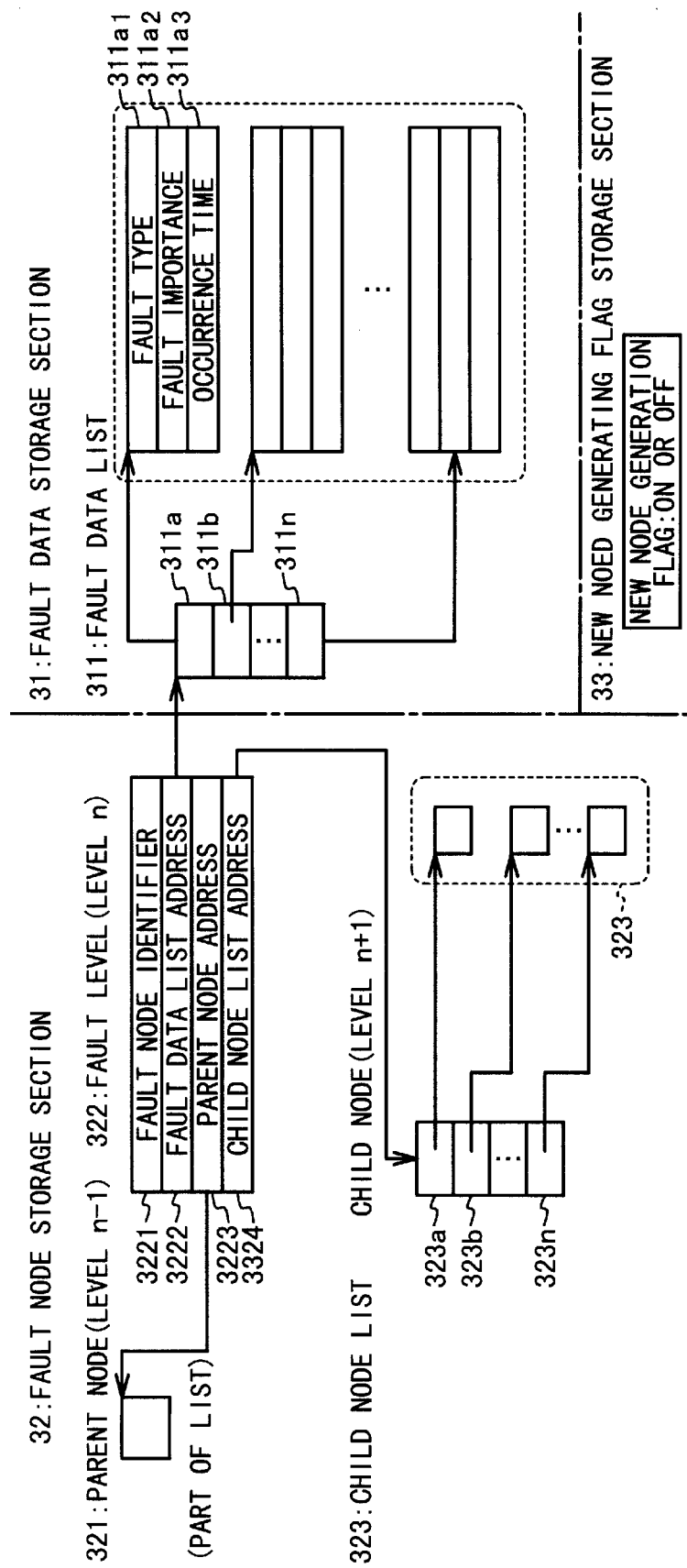
FIG. 2 is a block diagram showing the structure of a storage unit in the first embodiment of the present invention.

Referring to FIG. 2, a fault data list 311 is stored in the fault data storage section 31. Addresses (311$a$, 311$b$, ..., 311$n$) of the fault data list 311 designate fault data stored in storage section 31 for every network element or every component of the network element such as a package and a channel port. Each of the fault data is composed of a classification 311$a$1 indicative of a type of a fault which has occurred in the node, a fault importance level 311$a$2 and a fault occurrence time 311$a$3.

Also, as shown in FIG. 2, the fault node storage section 32 stores a parent node list 321, a child node list 323, and fault node data 322. An address of the parent node list 321 designates the fault node data 322. Each fault node data 322 is composed of a fault occurrence node identifier 3221 to distinguish a fault node data, and an address data 3222 to the fault data list 311 stored in the fault data storage section 31. Moreover, each fault node data 322 contains an address data 3223 to the parent node of a parent node list and an address data 3224 to the child node list 323 (323$a$, 323$b$, ..., 323$n$). In this way, the fault nodes can be managed in the fault node storage section 32 based on the address data to the parent node and the child node list in the node structure of a tree form. Therefore, a fault occurrence location and the fault data in the network of a hierarchy structure can be easily managed for every fault node data.

Also, a data is stored in the new node generation flag storage section 33 to indicate that a fault node data is newly generated, when there is not a node corresponding to the fault occurrence node identifier of the fault association notice in the fault node storage section 31. For example, the value of "OFF" is stored in an initial state and such data is changed into the value of "ON" when the new fault node data is generated.

(Fault Data Control Unit)

Also, the fault data control unit 2 is composed of a fault data receiving section 21, a fault node data searching section 22, a fault node data generating section 23, a fault data searching section 24, a fault data generating section 25, a fault data updating section 26, a fault data deleting section 27 and a fault node data deleting section 28.

The fault data receiving section 21 receives a fault association notice from a network element in which any fault has occurred, and extracts a fault occurrence node identifier and a fault data from the fault association notice.

Also, the fault node data searching section 22 searches existing fault node data which are stored in the fault node storage section 32 based on the fault occurrence node identifier extracted by the fault data receiving section 21. In case of execution of the searching operation of the fault node data, the node structure of the tree form is traced from the route level to the leaf level in an order.

Also, the fault node data generating section 23 generates and adds the fault node data to the fault node storage section 32 as a new fault node data, when the fault node data is not found out as the result of the searching operation of the fault node storage section 32 by the fault node data searching section 22.

Also, the fault data searching section 24 searches a fault data list 311 to the existing fault node data searched by the fault node data searching section 22 to determine whether or not the same fault classification as the fault data of the fault association notice exists.

Also, the fault data generating section 25 newly generates and adds a fault data to the fault data storage section 31, when a fault node data is newly generated by the fault node data generating section 23 or when any fault having the same classification as the received fault classification data is not found out as the result of the searching operation of the fault data by the fault data searching section 24.

Also, the fault data updating section 26 updates the importance of the fault when the fault having the same classification as the fault classification of the received fault association notice is found out as the result of the searching operation of the fault data by the fault data searching section 24, and when the received fault association notice is a notice other than a restoration notice.

Also, the fault data deleting section 27 deletes the fault data from the fault data storage section 31 when the fault having the same classification as the fault classification of the received fault association notice is found out as the result of the searching operation of the fault data storage section 31 by the fault data searching section 24, and the received fault association notice is the restoration notice.

Also, when the fault child node list 323 of the fault node data is empty after the fault data is deleted from the fault data storage section 31, the fault node data deleting section 28 regards that the fault node data does not show the occurrence of the fault and the fault node data is deleted from the fault node storage section 32. Similarly, the fault node data deleting section 28 checks to the parent node of the deleted fault node, the existence or non-existence of the fault data and the existence or non-existence of the fault child node list 323.

(The Operation of the First Embodiment)

Figure 3:
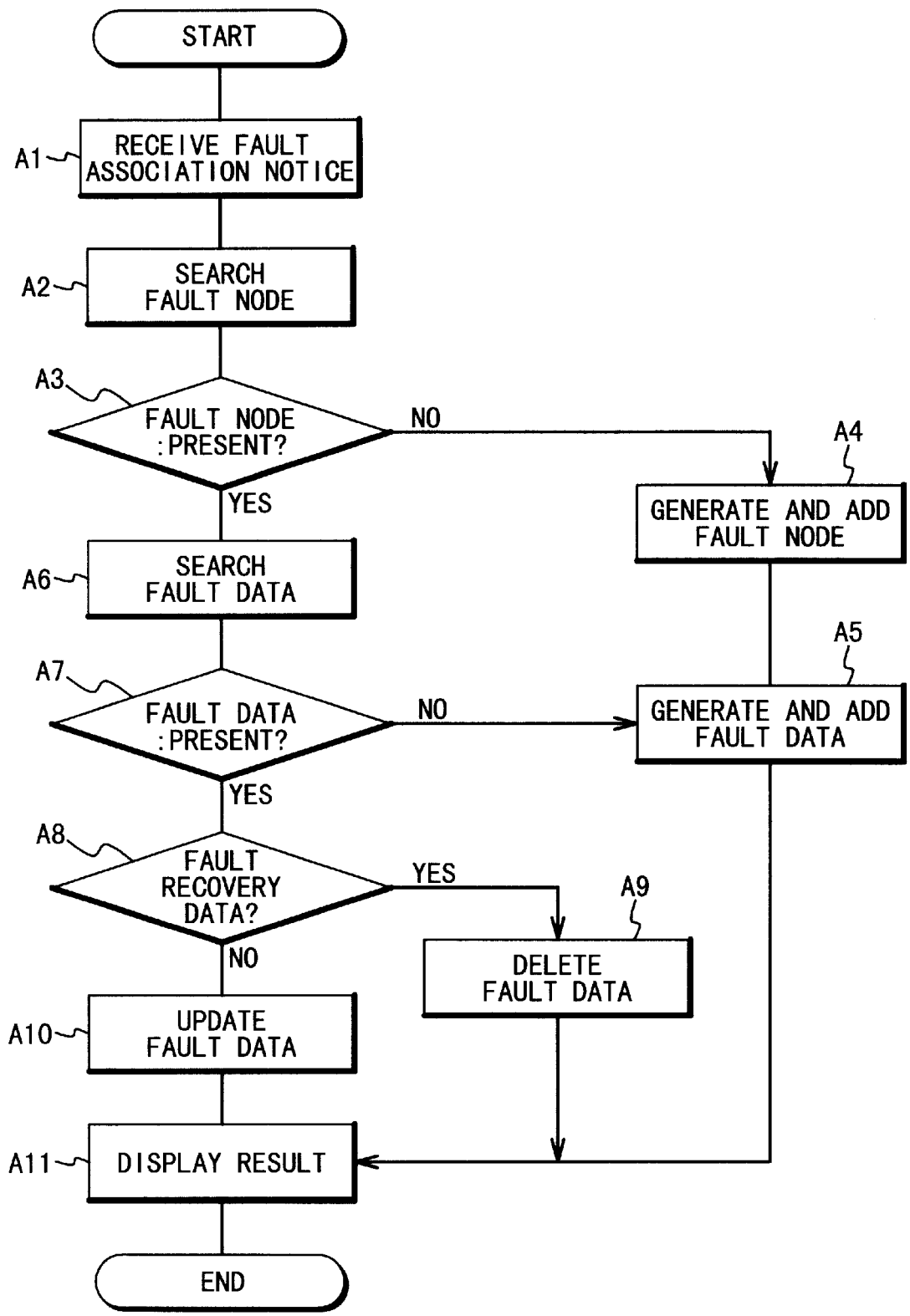
FIG. 3 is a flow chart to show a network fault data processing method in the first embodiment of the present invention.

Next, the operation of the whole network fault management system in the first embodiment will be described with reference to the block diagram of FIG. 1 and the flow chart of FIG. 3.

When the fault occurs in a network element as a component of the network, a fault association notice is transferred to the fault data receiving section 21 from the network element. The fault data receiving section 21 takes out a fault occurrence node identifier indicative of the fault occurrence location from the received fault association notice, and transfers the identifier to the fault node data searching section 22 (step A1 of FIG. 3).

The fault node data searching section 22 searches the existing fault node data tree structure stored in fault node storage section 32 for the fault node data having the same identifier, using the identifier of the fault occurrence location as the key identifier (Step A2).

When no fault node data is found out as the result of the searching operation, i.e., in case of "NO" in step A3, the fault occurrence location is determined to be a new fault node. Thus, a new fault node data is generated and added to the fault node storage section 32 by the fault node data generating section 23 to indicate the new fault node (Step A4). In this case, the fault association notice is transferred from the fault node data searching section 22 to the fault data generating section 25. Then, a new fault data showing a fault state of the new fault node is generated and added to the fault data storage section 31 by the fault data generating section to indicate the new fault (Step A5).

On the other hand, when the fault node data is found out as the result of the searching operation, i.e., in case of "YES" at the step A3, the fault data list 311 stored in the fault data storage section 31 is searched by the fault data searching section 24, using a fault classification contained in the fault data of the fault association notice as a search key, to determine the fault data having the same fault classification as the fault classification of the fault association notice (Step A6).

When the fault classification is not found out in the the fault data list as the result of the searching operation, i.e., in case of "NO" at the step A7, a new fault data is determined to have been generated in the correspondence to the fault node data. Then, the fault data indicative of the fault shown by the fault association notice is generated and added to the fault data storage section 31 by the fault data generating section 25 (Step A5).

On the other hand, when the fault classification is found out in the list of the fault data as the result of the searching operation, i.e., in case of "YES" at the step A7, the fault data searching section 24 checks the fault importance level which is contained in the fault data of the fault association notice, and determines whether the fault association notice is the notice of the fault restoration or fault recovery or is a change notice of the fault importance level other than the notice of the fault restoration (Step A8).

When the fault association notice is a restoration notice as a result of the determination, i.e., in case of "YES" at the step A8, the fault data deleting section 27 deletes the fault data from the fault data list stored in the fault data storage section 31 (Step A9).

On the other hand, in the case of the fault association notice except the restoration notice, i.e., in case of "NO" at the step A8 as the result of the determination, the fault data updating section 26 updates the fault importance level of the fault data stored in the fault data storage section 31 (Step A10).

Last, the processing result of the fault association notice is displayed on the output unit 1 (Step A11).

(Search Processing Operation of the Fault Node Data)

Next, the searching operation of hierarchically stored fault node data will be described with reference to the flow chart of FIG. 4 and FIG. 8.

Figure 8:
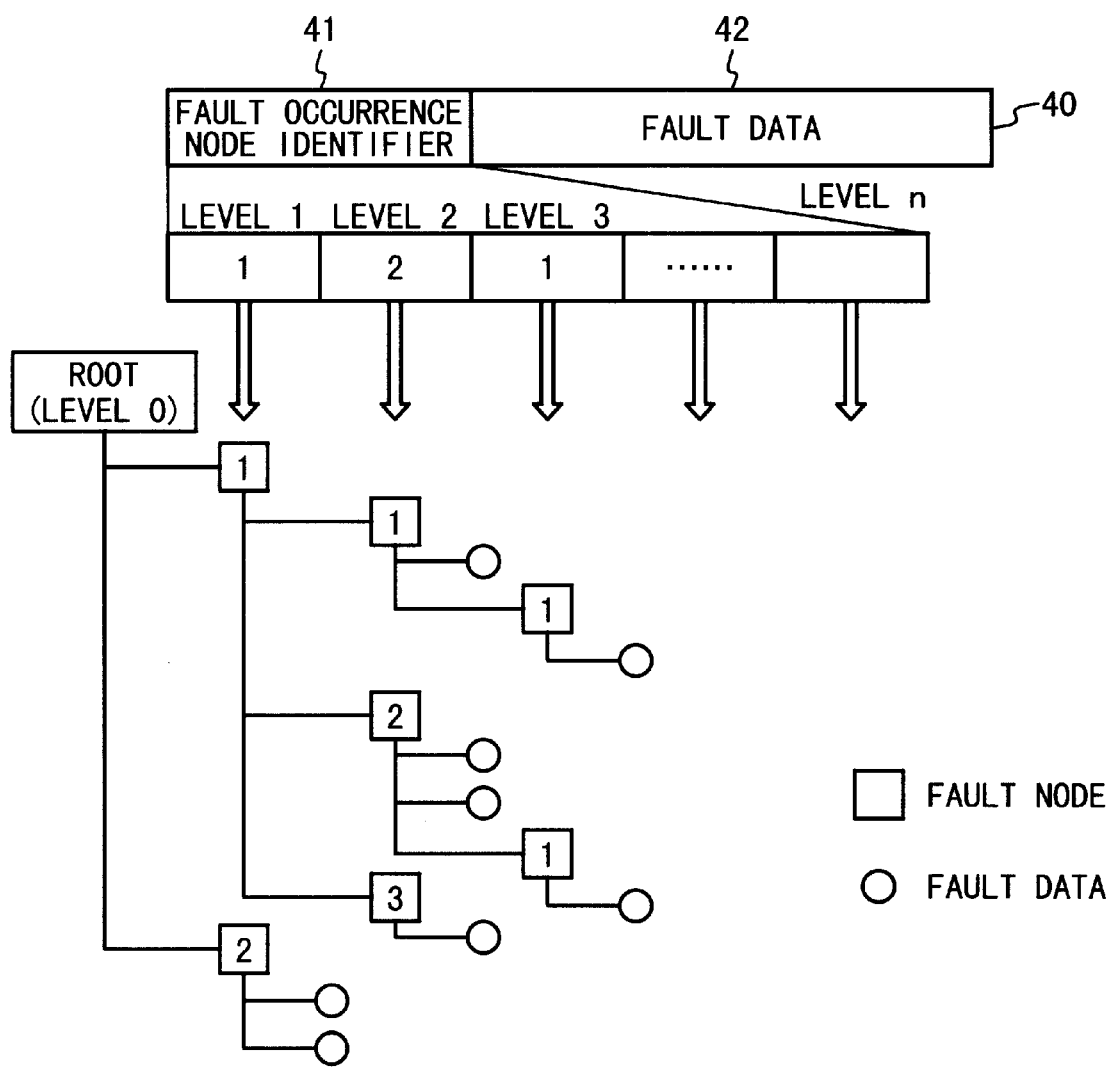
FIG. 8 is a diagram showing a fault occurrence data.

First, referring to FIG. 8, the fault data 40 sent from a network element is mainly divided into the fault occurrence node identifier 41 indicative of the fault occurrence location and a fault data 42.

Moreover, the fault occurrence node identifier 41 is hierarchical, and the values of the fault occurrence node identifiers 41 are classified and stored into a plurality of levels such as level 1, level 2, level 3, . . . , level n. Each of the levels corresponds to one layer in the tree structure of the fault node data. In this case, a root node of the fault node data tree is set to level 0.

Figure 4:
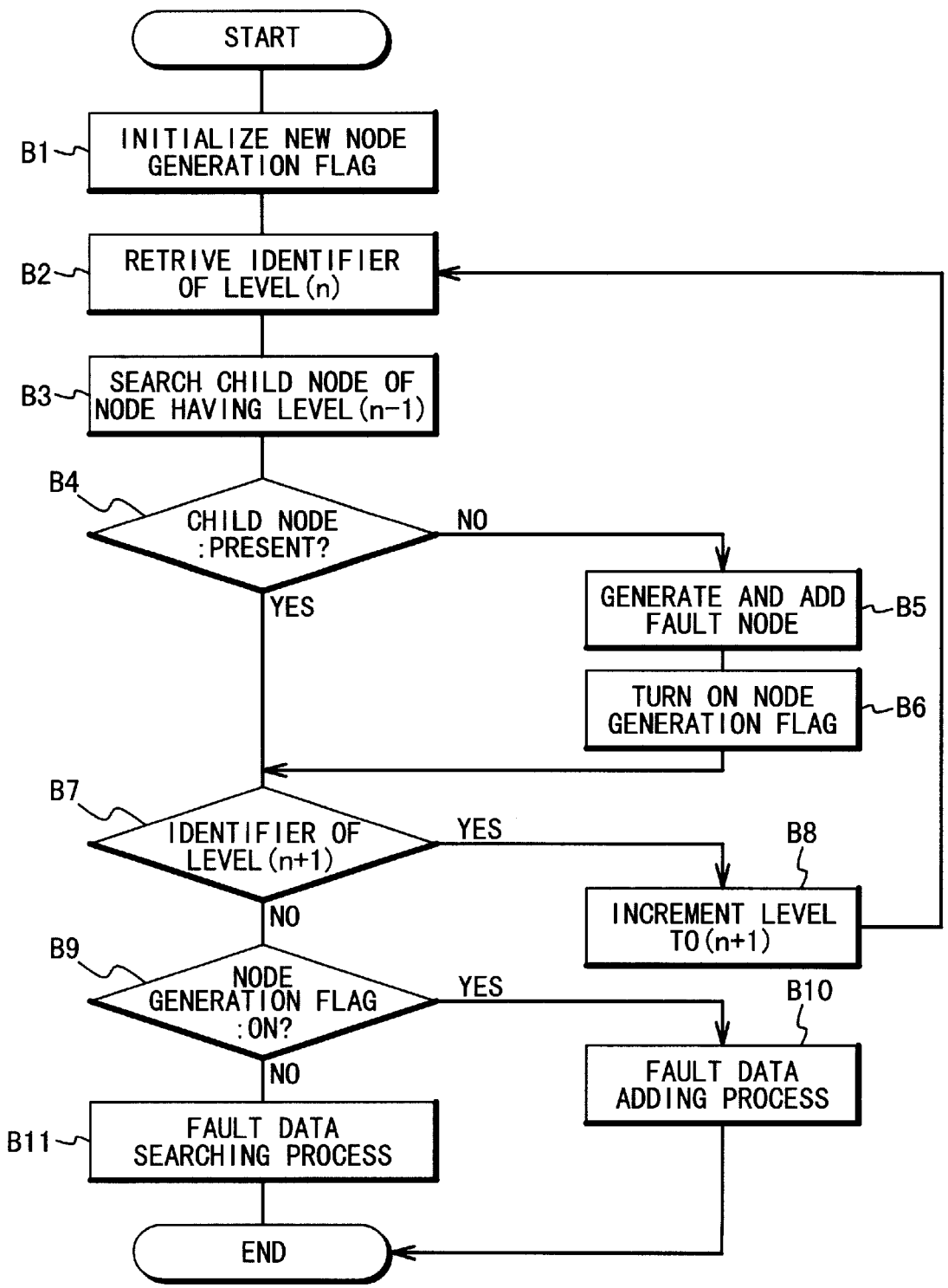
FIG. 4 is a flow chart to show a search processing operation of a fault node data in the first embodiment of the present invention.

When the fault node data searching operation is started by the fault node data searching section 22, the value of a new node generating flag is initialized to "OFF" (step B1 of FIG. 4).

Next, the identifier of the level 1 is taken out from the fault occurrence node identifier 41 of the hierarchy tree structure (Step B2).

A list of child nodes 323 of the level 0 as the parent node of the level 1, i.e., the route level is searched using the taken out identifier as a key (Step B3).

When the node having the same identifier as the key is not found out in the list of child nodes 323, the fault node data having the same identifier as the key is generates and added to the list of child nodes 323 (Step B5).

Moreover, a new node generation flag stored in the new node generation flag storage section 33 is set to "ON" to indicate that the fault node data is not found out and the fault node data is newly generated (Step B6).

It is checked whether or not the level next to the current level is present in the fault occurrence node identifier, when a child node is found out, i.e., in case of "YES" in the step B4, or after the step B6.

When the next level of the fault occurrence node identifier 41 is present, i.e., in case of "YES" in the step B7, the level is advanced to the next level (step B8) and the control returns to the step B2.

Subsequently, the processes from the step B2 to the step B8 are repeated until the last level of the fault occurrence node identifier 41. Next, it is checked whether or not the new node generation flag is set to "ON", when the next level of the fault occurrence node identifier 41 is not present, i.e., in case of "NO" at the step B7 (Step B9).

Because a new fault is regarded as being occurred when the new node generation flag is set to "ON", the fault data generating section 23 is requested to carry out a process of adding a new fault data. Then, the control is ended (Step B10).

When the new node generation flag is kept to "OFF", the fault data searching section 24 is requested to carry out a searching operation of the fault node data, for an adding or deleting process of a fault data to or from the existing fault node data, and an updating process of the fault data. Then, the control is ended (Step B11).

(Search Processing by the Fault Data)

Next, the searching operation of the fault data associated with a specific fault node data will be described with reference to the flow chart of FIG. 5.

Figure 5:
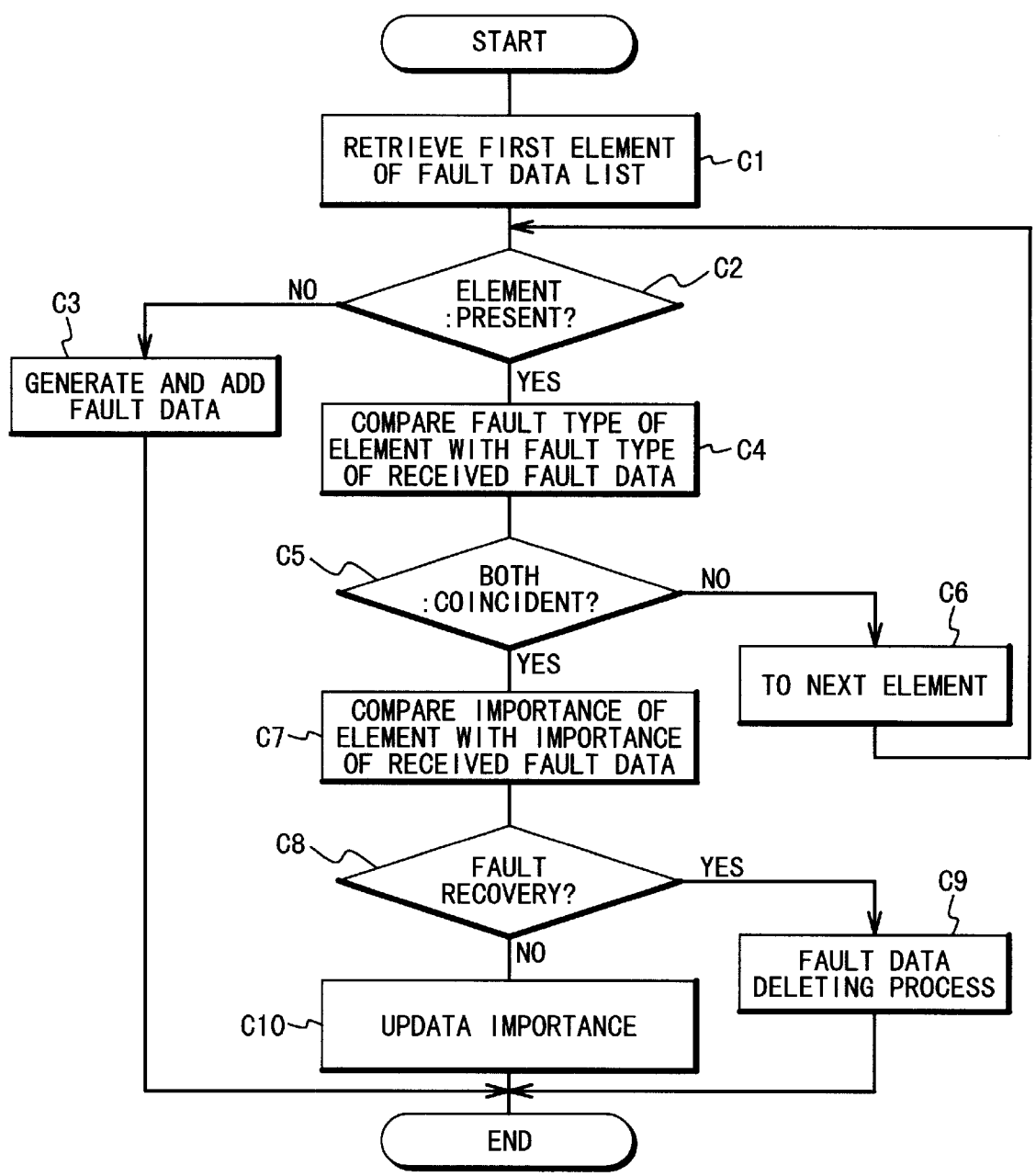
FIG. 5 is a flow chart to show an updating processing operation of a fault node data and restoration processing operation of a fault node in the first embodiment of the present invention.

First, the first element is taken out from the fault data list 311 stored in the fault data storage section 31 (step C1 of FIG. 5).

When any element is not found out, i.e., in case of "NO" at a step C2, it is regarded that any fault does not have occurred in the node corresponding to the fault node data, but any fault has occurred in the child node corresponding to the child fault node data. Then, a fault data is newly generated and added to the fault data list 311 (Step C3).

When the fault data element is present, i.e., in case of "YES" at the step C2, the classification of the fault data of the received fault association notice and the classification of the fault data element are compared with each other (Step C4).

When the classifications are not coincident with each other, the control advances to the element next to the above element in the list 311 (step C6). Then, the control returns to the step C2.

Subsequently, the processes from the step C2 to the step C6 are repeated until the last element of the list 311 to carry out the comparing operation of the classification.

When the classifications are coincident with each other as the result of the comparing operation, i.e., in case of "YES" at the step C5, the fault importance level is next checked (Step C7).

When the received fault association notice is a notice indicative of restoration of the fault as the result of the comparing operation, i.e., in case of "YES" at the step C8, the fault data deleting section 27 is requested to carry out the deleting operation of fault data. Then, the control is ended (Step C9).

When the fault association notice is other than the restoration notice, i.e., in case of "NO" at the step C8, the fault data updating section 26 updates the fault importance level (Step C10).

(The Deleting Operation of the Fault Data and the Fault Node Data)

Next, the deleting operation of the fault data and the fault node data operate will be described with reference to FIG. 6 and FIG. 7.

Figure 6:
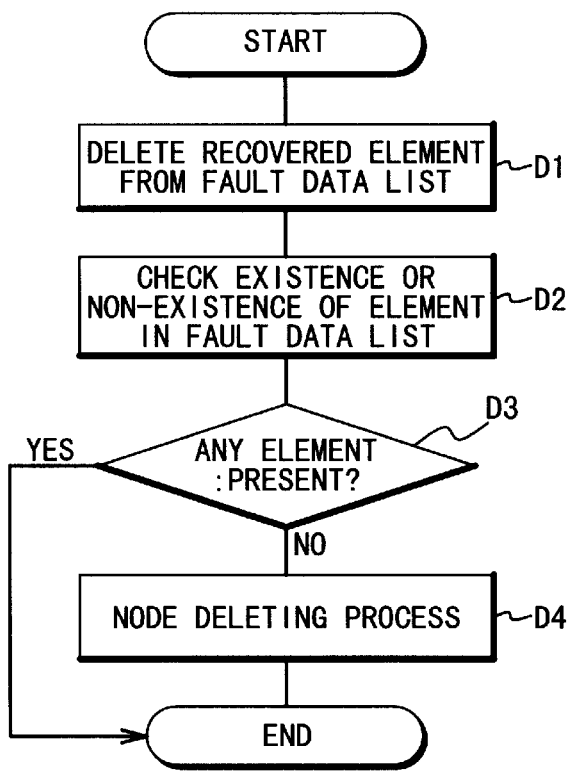
FIG. 6 is a flow chart to show a deleting operation of the fault data in the first embodiment of the present invention.

The fault data deleting section 27 traces the fault data list 311 using the addresses of the fault data list 311 of the specified fault node data, and deletes from the fault data list 311, the fault data having the same fault classification as the fault classification contained in the fault data of the received fault association notice (step D1 of FIG. 6).

Next, it is checked whether or not another fault data is in the list of fault data 311 (Step D2).

When the other fault data is stored in the list 311 as the result of the checking operation, i.e., in case of "YES" at a step D3, the control is ended. On the other hand, when all the fault data have been deleted from the list 311 as the result of the deleting operation, i.e., in case of "NO" at the step D3, the control requests the fault node data deleting section 28 to carry out the deleting operation of the fault node data stored in the fault node storage section 32 (Step D4).

Figure 7:
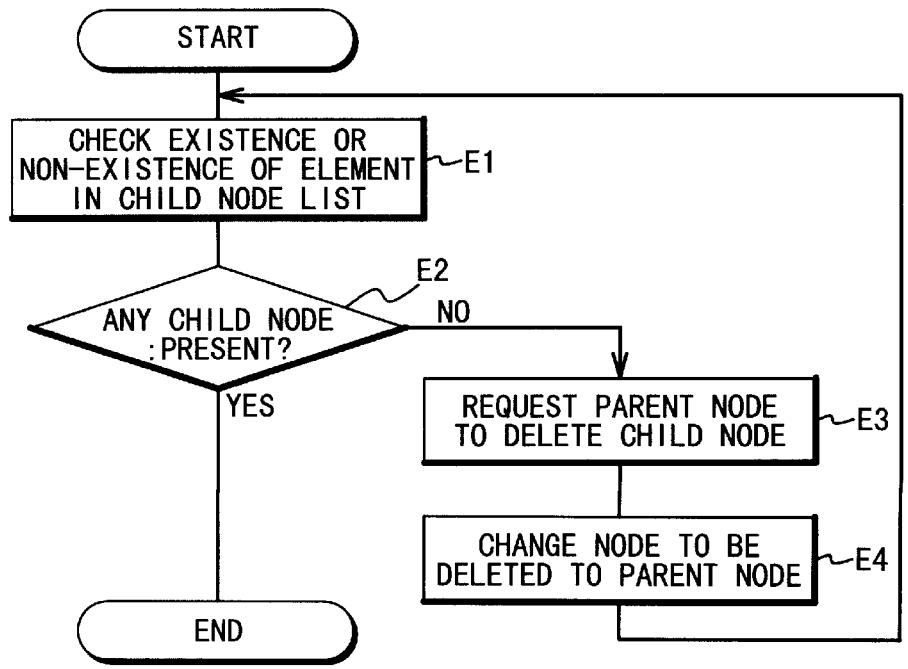
FIG. 7 is a flow chart to show the detail of the deleting operation of the fault data in the first embodiment of the present invention.

Referring to FIG. 7, the fault node data deleting section 28 accesses the child node list 323 associated with the specified fault node data, and checks whether or not the child node is present (Step E1 of FIG. 7).

When the child node is present, i.e., in case of "YES" at a step E2, the fault of the fault node data is regarded as not being yet canceled, and the control is ended.

When the child node is not present, i.e., in case of "YES" at the step E2, it is regarded that data associated with the fault node data are all deleted, and then the fault node data is deleted from the list of the parent fault node data 321 (Step E3).

Moreover, a node to be deleted is transferred to the parent fault node data list 321 (step E4), and the processes from the step E1 to the step E4 are repeated to go back to the parent node such that the tree structure of the fault node data is updated.

(Operation Example 1)

Figure 9:
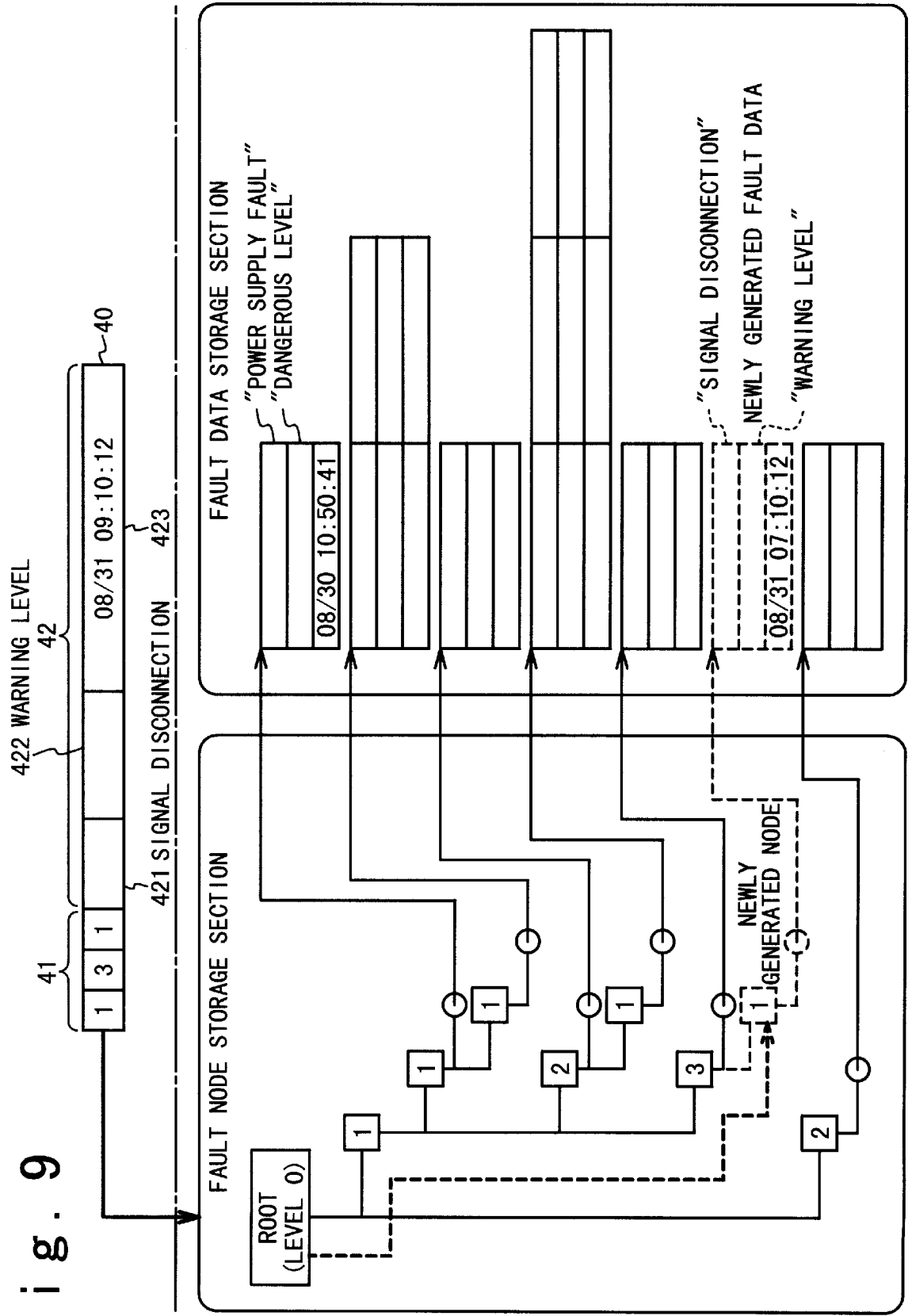
FIG. 9 is a diagram of an addition processing operation of a new fault node based on the fault occurrence data.

Next, a specific operation example 1 will be described with reference to FIG. 9.

In this operation example 1, the following conditions are supposed. That is, the fault association notice (alarm) 40 received from a network element in the network contains the fault occurrence node identifier 41 indicative of the fault occurrence location of "1-3-1", for example. The fault association notice 40 has as the fault data 42, a fault classification 421 indicative of a signal disconnection that a communication is broken, and a fault importance level 422 as a warning level, and a fault occurrence date of Aug. 31, 1999 and fault occurrence time 423 of 9:10:12 a.m.

The operation example in the above case will be described.

In this case, the fault data receiving section 21 first takes out the fault occurrence node identifier 41 of "1-3-1" from the received fault association notice 40 (Step A1).

Also, the fault node data searching section 22 set the new node generation flag stored in the new node generation flag storage section 33 to "OFF" (step B1), and takes out "1" as the level 1 of the identifier of "1-3-1" (Step B2).

Next, the fault node data searching section 22 accesses the child fault node data list 323 of the level 0 in the fault node storage section 32, i.e., the child fault node data list of the route node, and searches the node having the same identifier as the identifier "1" of level 1 (Step B3).

Because the child node having the identifier of "1" as the result of the searching operation is found out, it is checked whether or not the level 2 of the identifier is present (step B7). Because the child node having the identifier of "2" is present, the identifier of "3" of the level 2 of "1-3-1" is taken out (Step B8 and Step B2).

At this time, the child fault node data list 323 of the node of the level 1 is accessed and the node having the same identifier as the identifier of "3" in the level 2 is searched (Step B3).

As a result of the searching operation, the identifier of the level 3 of "1-3-1" is present while the fault node data having the identifier is present in the fault node storage section 32. Therefore, the node having the identifier of "1" in the level 3 is searched (Step B3 to Step B8).

As a result of the searching operation, the fault node data having the identifier of "1" of "1-3-1" in the level 3 is not present in the fault node storage section 32 ("NO" at the step B4). For this reason; in the operation example 1, a new fault node data having the identifier of "1" in the level 3 is generated and added to the list 323 of the fault node data in the fault node data storage section 32 (Step B5). Moreover, a new node generation flag is set to "ON" (Step B6).

Because the identifier in the level 4 is not present, the control advances to the step B9 ("NO" at the step B7). Because the generation flag is set to "ON", the fault data is to be added to the newly generated fault node data (Step B10).

After the addition of the fault data, the output unit 1 displays the fact that the fault node data having the identifier of "1-3-1" is added to the fault tree structure (Step A11).
(Operation Example 2)

Figure 10:
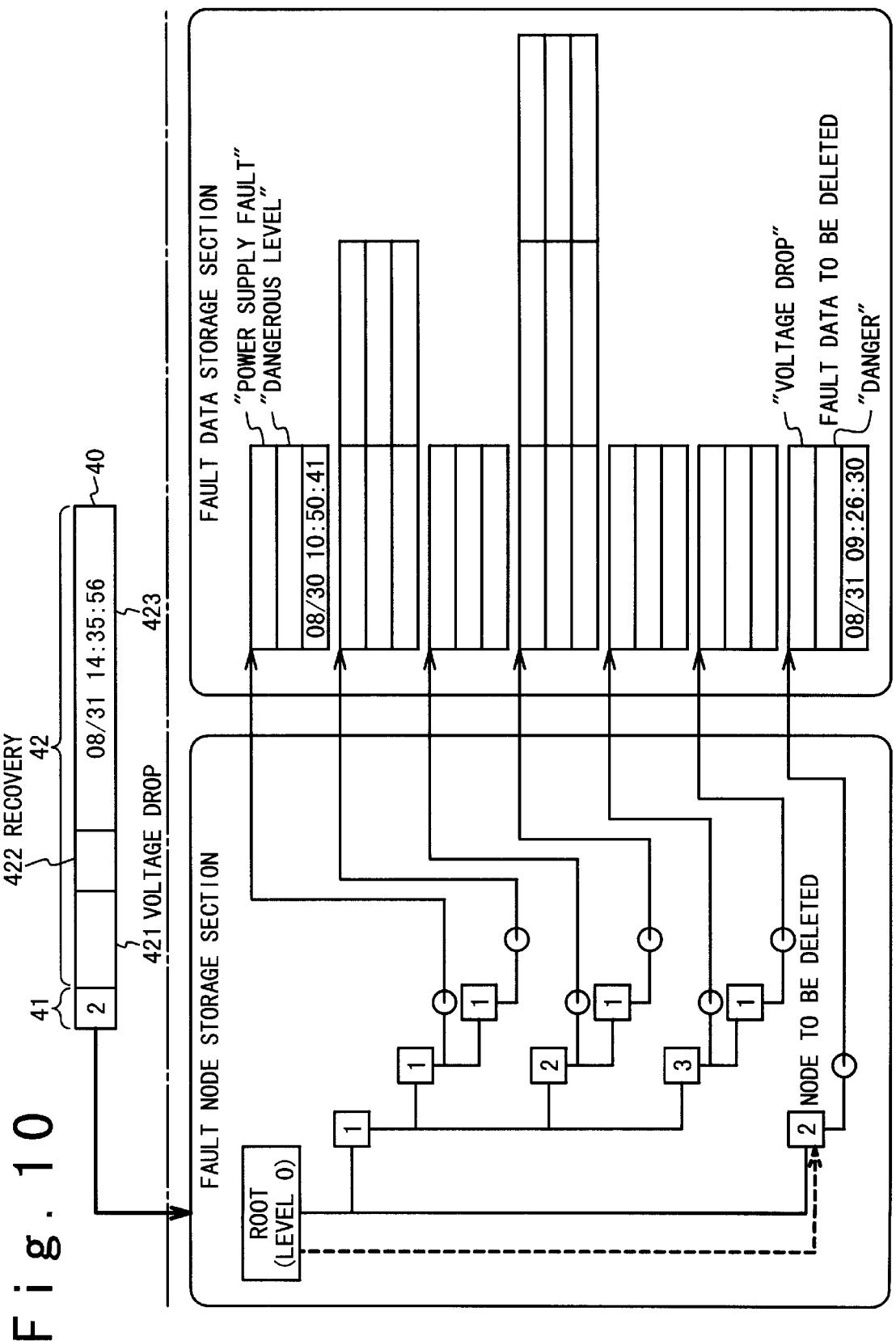
FIG. 10 is a diagram of a deletion processing operation of a fault node based on the fault occurrence data.

Next, a specific operation example 2 will be described with reference to FIG. 10. In the operation example 2, the following matters are supposed. That is, the fault association notice (alarm) 40 received from a network element in the network contains a fault occurrence not identifier 41 showing a fault occurrence location of "2". Moreover, the fault association notice 40 contains as the fault data 42, a fault classification 421 of the voltage drop, fault occurrence date and time 423 of 9:26:30 a.m. on August 31, and a fault importance level 422 of a restoration notice.

The operation example in such conditions will be described.

First, the fault data receiving section 21 takes out the identifier 41 of "2" from the received fault association notice (step A1), and starts the searching operation of the tree structure of the fault node data (Step A2).

As the result of the searching operation, when the node having the identifier of "2" in the level 1 is found out, i.e., in case of "YES" at the step A2 to Step A3, the fault data searching section 26 accesses the fault data storage section 31 to search the fault data corresponding to the fault node data with the level of "2". Then, it is checked whether the fault data is new one or an existing one (Step A6).

In this operation example 2, the fault data searching section 24 finds out the fault data having the "voltage drop" which is the same fault classification as the fault classification 421 of the fault association notice 40 from the fault data storage section 31. Also, the fault importance level 422 in the field 42 of the received fault association notice is "restoration". Therefore, the fault data deleting section 27 deletes the fault data corresponding to the fault node data of "2" from the fault data storage section 31 (Step D1 at a Step A9).

Moreover, after the fault data is deleted at the step A9, it is determined whether or not another fault data corresponding to the fault node data with the level of "2" is left in the fault node storage section 32 (Step D2).

In this operation example 2, because there is not the other fault data corresponding to the fault node data with the level of "2" ("NO" at the step D3), the fault data deleting section 27 requests the fault node data deleting section 28 to carry out the deleting operation of the fault node data corresponding to the identifier of "2"(Step D4).

The fault node data deleting section 28 determines whether or not the child fault node data corresponding to the identifier of "2" is present in the child fault node data list (Step E1).

In this operation example 2, the child fault node data list 323 corresponding to the fault node data of "2" is not present ("NO" at the step E2). Therefore, it is regarded that the fault is not present in the fault node data of "2" no longer and the fault node data of "2" is deleted from the child fault node data list 323 of the route level which is the parent node of the fault node data of "2" (Step E3).

Next, a node to be deleted is changed to the route node (step E4), and it is checked whether or not the child fault node data list is present, in the same way (Step E1). As shown in FIG. 10, as the result of the checking operation, the fault node data of "1" is still present in the route node (YES of step E2). Therefore, the deleting operation of the fault node data from the fault node storage section 32 is ended.

After the fault data and the fault node data are deleted, the output unit 1 displays the fact that the fault node data of "2" is deleted from the fault occurrence tree.

Second Embodiment

Next, the second embodiment of the present invention will be described with reference to FIG. 11.

Figure 11:
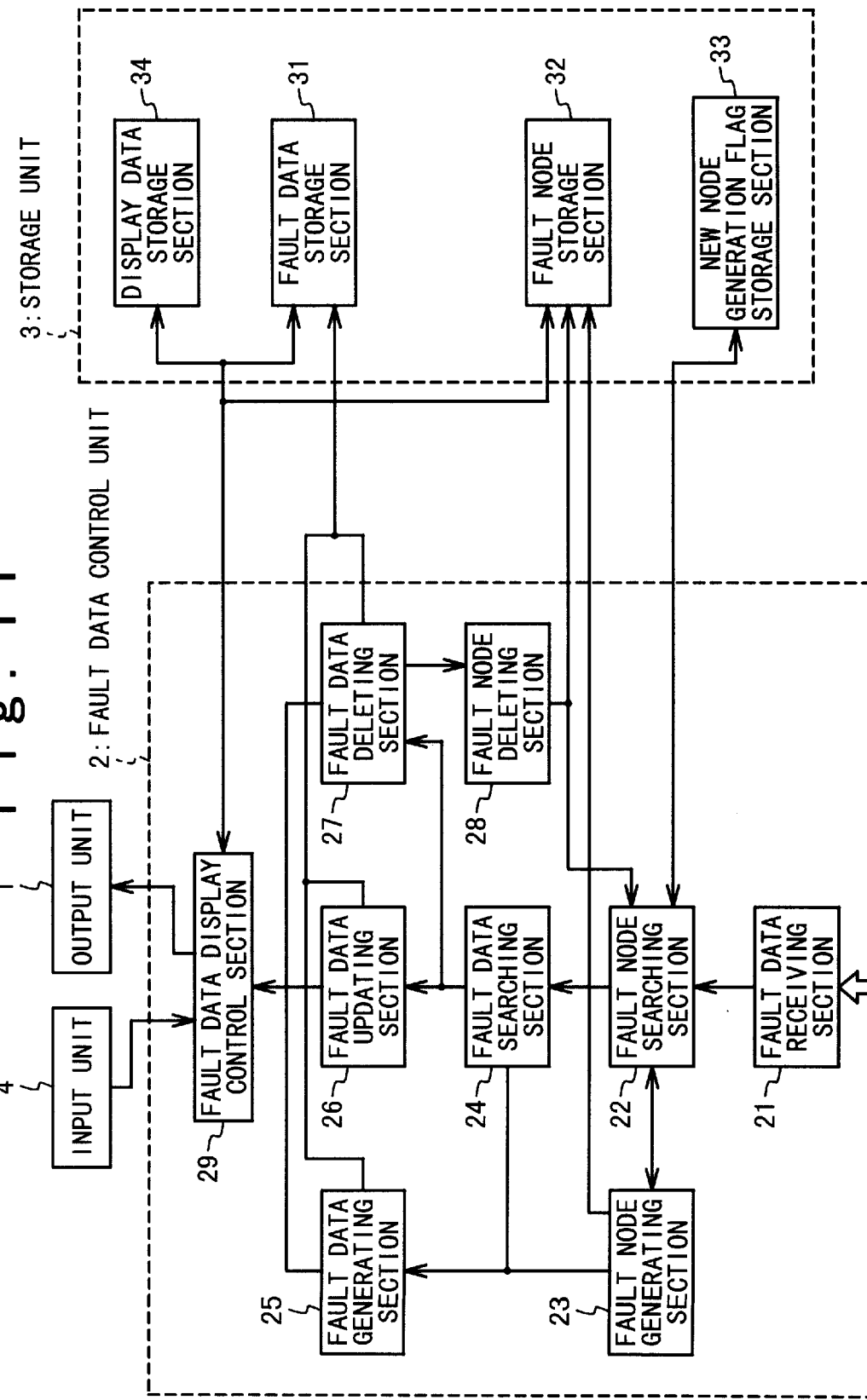
FIG. 11 is a function block diagram to show the network fault data management system according to the second embodiment of the present invention.

As shown in FIG. 11, the network fault data management system in the second embodiment has an input unit 4 such as a keyboard and a mouse, a fault data display control unit 29 in the fault data control unit 2 and a display data storage section 34 in the storage unit 3 in addition to the structure of the first embodiment.

Then, the input unit 4 operates to receive an operation command of the fault node data tree structure from an operator.

Also, the fault data display control unit 29 controls the output unit 1 to display in the tree structure, the fault data which have been processed by the fault data generating section 25, the fault data updating section 26 and the fault data deleting section 27 which are shown in the first embodiment of the present invention, in response to a display demand of the fault node data tree from the operator.

Figure 12:
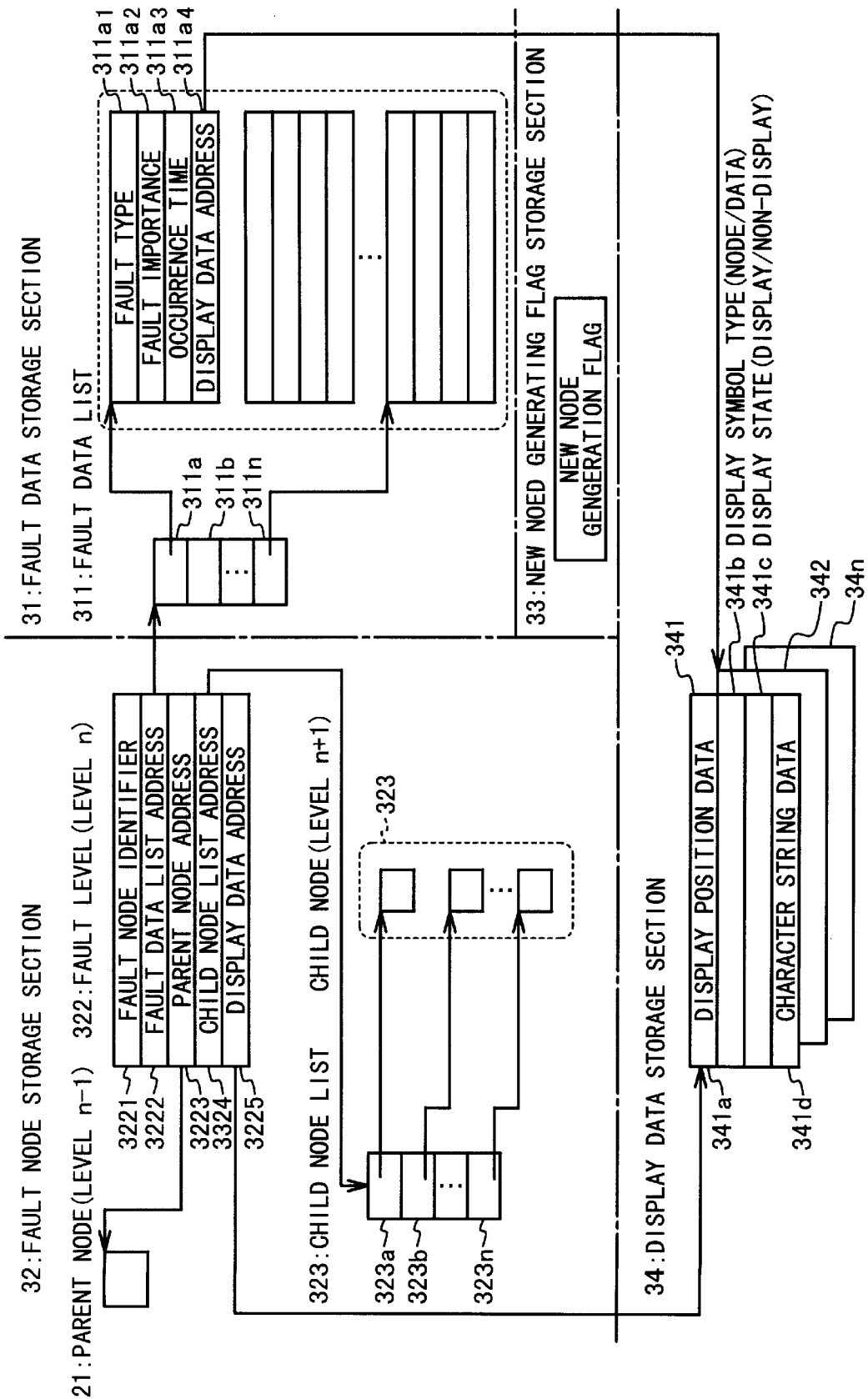
FIG. 12 is a diagram showing a relation of a fault node data, a fault data and a display data in the second embodiment of the present invention.

As shown in FIG. 12, the display data storage section 34 stores the symbol classification 341b to display of a display position data 341a, a symbol display state 341c, and a character string such as the node identifier or fault classification to be displayed on the symbol, as the display data 341, 342, . . . , 34n to display the fault node data 322 and the fault data 311 on the output unit 1.

The display data provided every each set of the fault node data and the fault data is stored in the display data storage section 34. The fault node data 322 and the fault data 311 have addresses 3225 and 311a4 to the display data, respectively. Therefore, it is possible to acquire the display data by referring to the addresses.

Next, an operation of the network fault data management system in the second embodiment will be described in detail with reference to the block diagram of FIG. 11 and the flow chart of FIG. 13.

Figure 13:
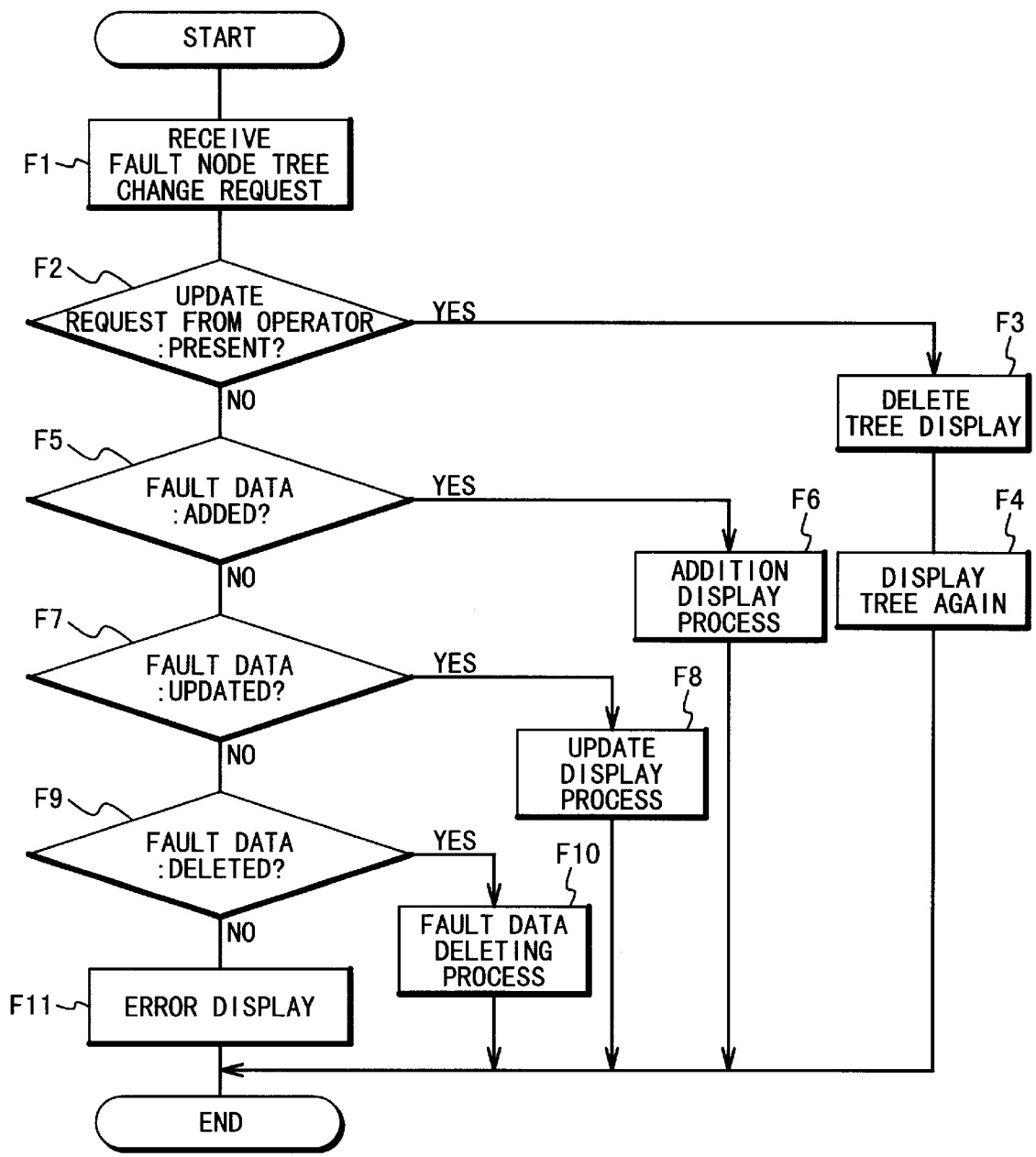
FIG. 13 is a flow chart showing the network fault data processing method in the second embodiment.

First, the fault data display control unit 29 receives a change request of the fault node data tree from the input unit 4, the fault data generating section 25, the fault data updating section 26 or the fault data deleting section 27 (step F1 of FIG. 13).

When a deleting request as the change request of the fault node data tree is supplied from the input unit 1 by the operator, i.e., in case of "YES" at a step F2, the deleting operation of the tree data displayed is requested to the output unit 1 (step F3), and a re-displaying operation of the tree is carried out (Step F4).

In case of new generation of a fault data, i.e., in case of "YES" at a step F4, an addition display operation is carried out and then the control is ended (Step F6).

In the same way, an update display operation is executed in case of an updating request of the fault data as the change request (step F8), and the deleting process of fault data is executed in case of a deleting request of the fault data (Step F10).

In case of neither of the updating request or the deleting request, i.e., in case of "NO" at the step F9, an error display message is displayed on the output unit 1. Then, the control is ended (Step F11).

(Tree Structure Displaying Process)

Next, the tree displaying process of the step F4 of FIG. 13 will be described in detail using FIG. 14.

Figure 14:
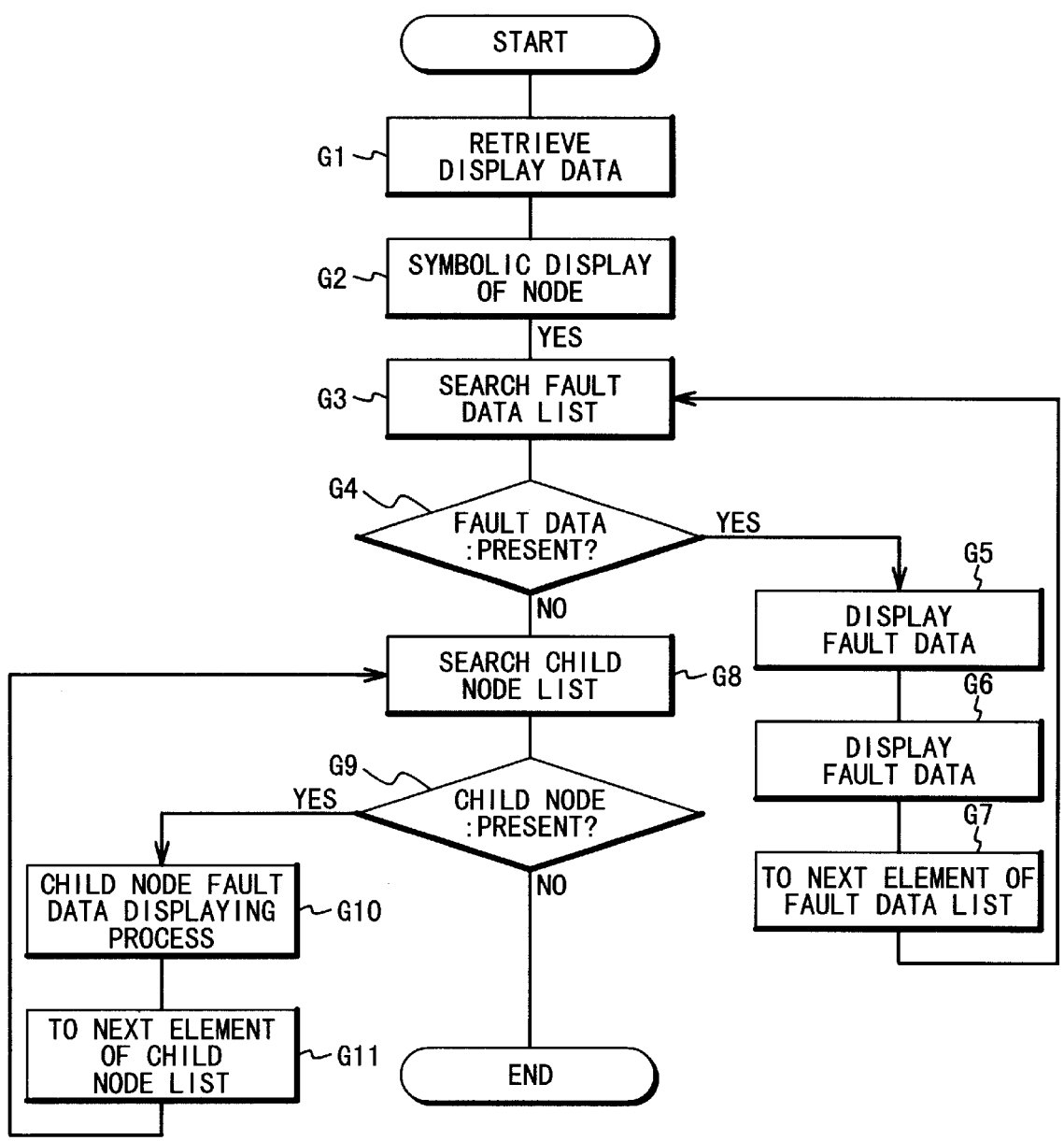
FIG. 14 is a flow chart showing a tree display processing operation in the second embodiment.

Referring to FIG. 14, the fault data display control unit 29 accesses the fault node storage section 32 to acquire the address of a display data of the specified fault node data and a display data associated with the fault node data from the display data storage section 34 (Step G1 of FIG. 14).

The symbol of the fault node data is displayed on the output unit 1 based on the display position data 341 of the acquired display data (Step G2).

Next, the fault data display control unit 29 accesses the fault data storage section 31 to search the list of the fault data and to display the fault data corresponding to each fault node data (Step G3).

When the fault data is present, i.e., in case of "YES" at a step G4, the fault data display control unit 29 accesses the display data storage section 34 to acquire the display data of the fault data (step G5). Then, the fault data display control unit 29 controls the output unit 1 to display the symbol of the fault data (Step G6). Thereafter, the control advances to the next element of the list of the fault data 311 (step G7). Then, the control returns to the step G3.

Until all the fault data are displayed after the above operation, the processes from the step G3 to the step G7 are repeated. When all the fault data are displayed, the control advances to a step G8 and the list of the child fault node data 323 is searched (Step G8).

When there is a child node, in case of "YES" at a step G9, the displaying process of fault data (step G1) is carried out to the child nodes in the same way (Step G10).

When the displaying process of the fault data of the child nodes ends, the control advances to an element of the list next to the above element (Step G11). Then, the control goes back to the step G8 to repeat the display of all child nodes.

In this way, it is possible to display the tree structure recursively to the fault node data at the final node.

(Addition Displaying Process)

Next, the addition displaying process at the step F6 of FIG. 13 will be described with reference to FIG. 15.

Figure 15:
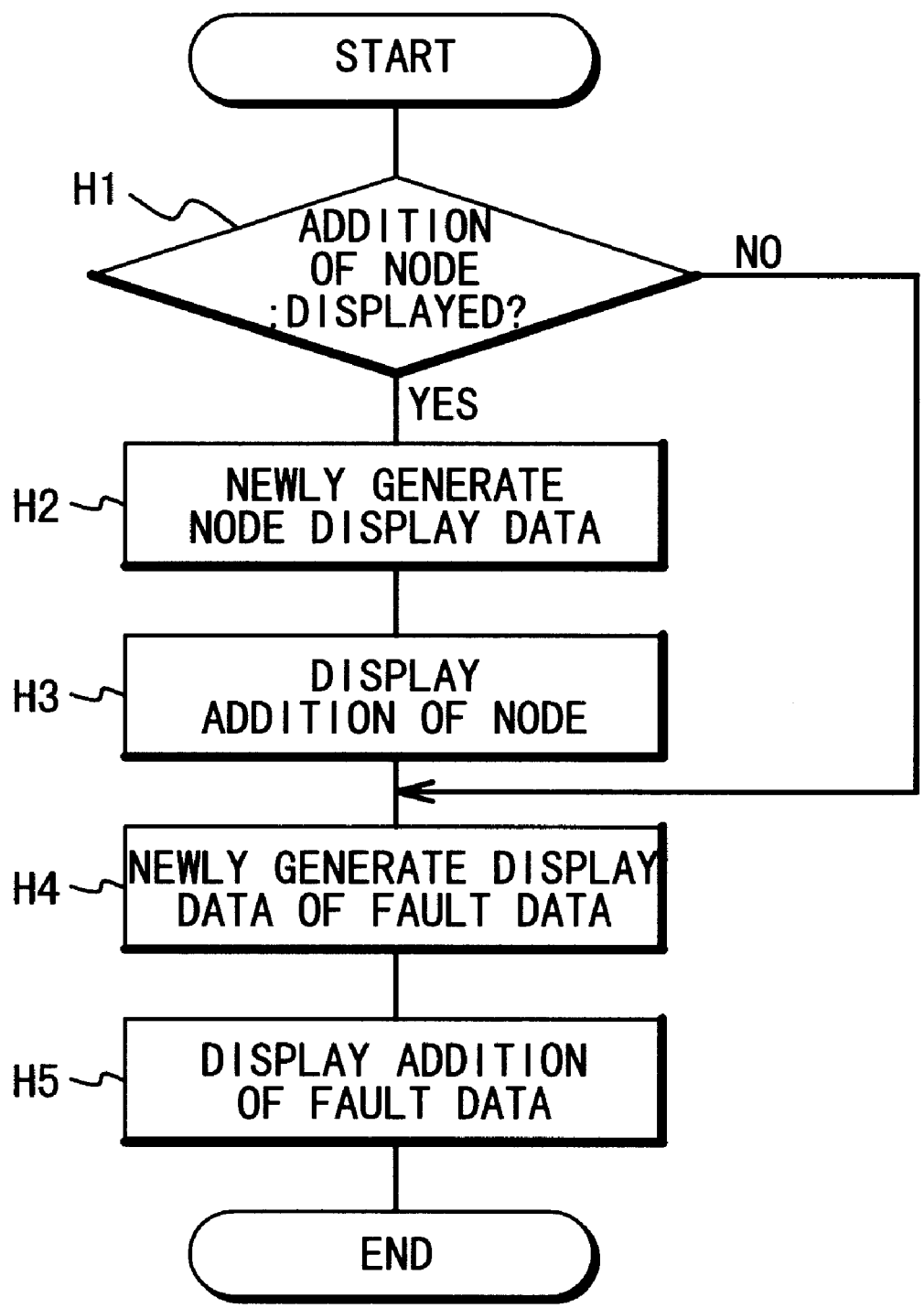
FIG. 15 is a flow chart showing an addition processing operation of a fault node in the second embodiment.

Referring to FIG. 15, the fault data display control unit 29 checks whether or not the addition displaying process of the fault node data should be carried out (step H1 of FIG. 15). When the addition displaying process of the fault node data should be carried out, i.e., in case of "YES" at the step H1, the display data of a node is newly generated and stored in the display data storage section 34 (Step H2). Subsequently, the symbol of the new fault node data is displayed on the output unit 1 based on the display symbol type 341b of the generated display data (Step H3).

Next, in order to display the fault data generated based on the newly added fault node data, the display data of the fault data is stored in the display data storage section 34 (step H4). Then, the symbol of the fault data is displayed on the output unit 1 based on the display symbol type 341b of the generated display data (Step H15).

(Updating Display Processing)

Next, the update displaying process of the step F8 of FIG. 13 will be described with reference to FIG. 16.

Figure 16:
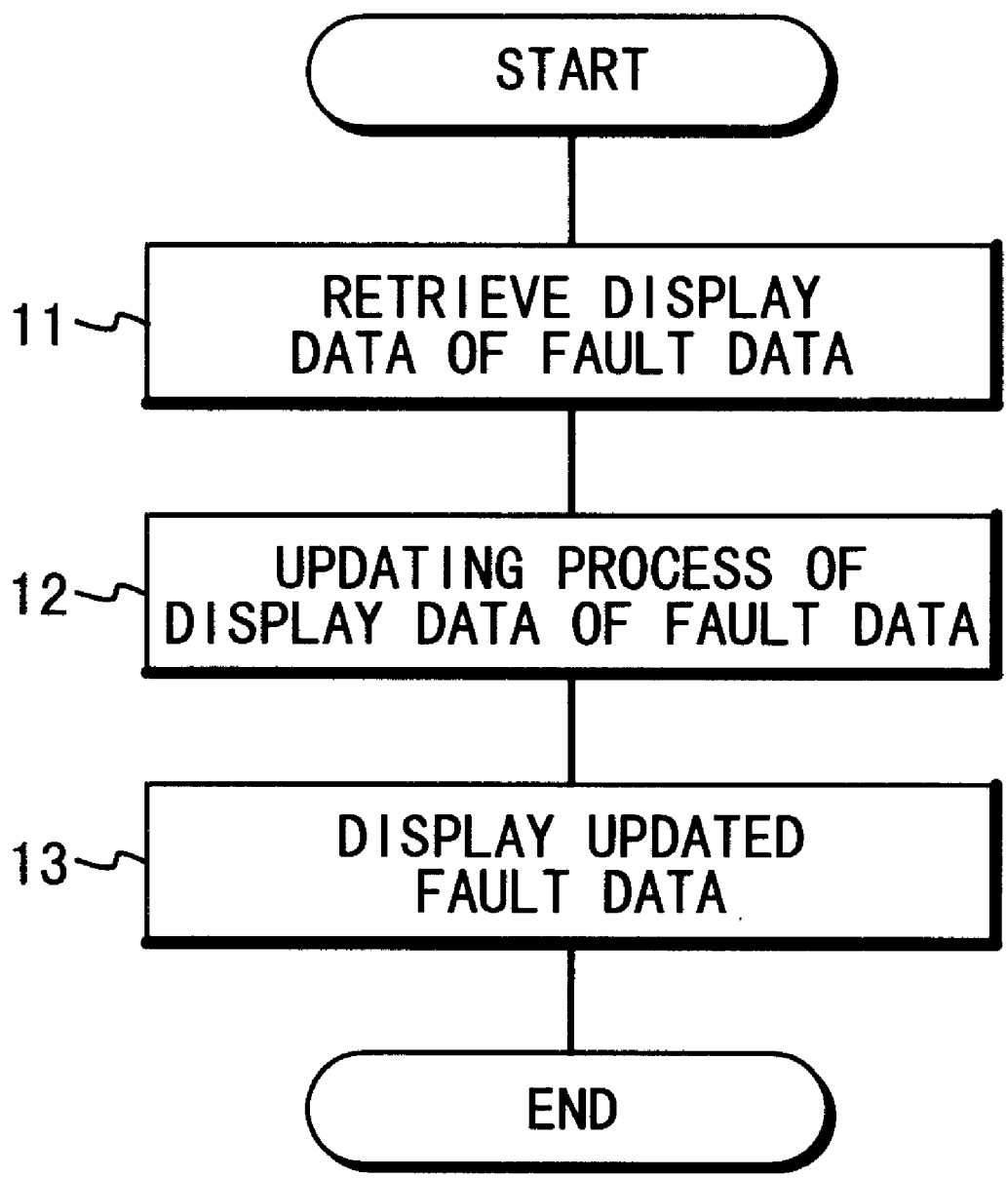
FIG. 16 is a flow chart showing an update display processing operation of a fault node in the second embodiment.

Referring to FIG. 16, the fault data display control unit 29 acquires the display data of the fault data as an update object from the display data storage section 34 (Step I1 of FIG. 16).

Next, a character string data 341d of the acquired display data is overwritten by the new fault data. For example, an process is carried out in such a manner that the importance level data of the fault which has been described in this embodiment is overwritten (Step I2).

Last, the symbol of the fault data is re-displayed on the output unit I based on the updated display data (Step I3).

(Deleting Processing Operation of the Fault Data)

The deleting processing operation of the fault data of the step F10 of FIG. 13 will be described with reference to FIG. 17.

Figure 17:
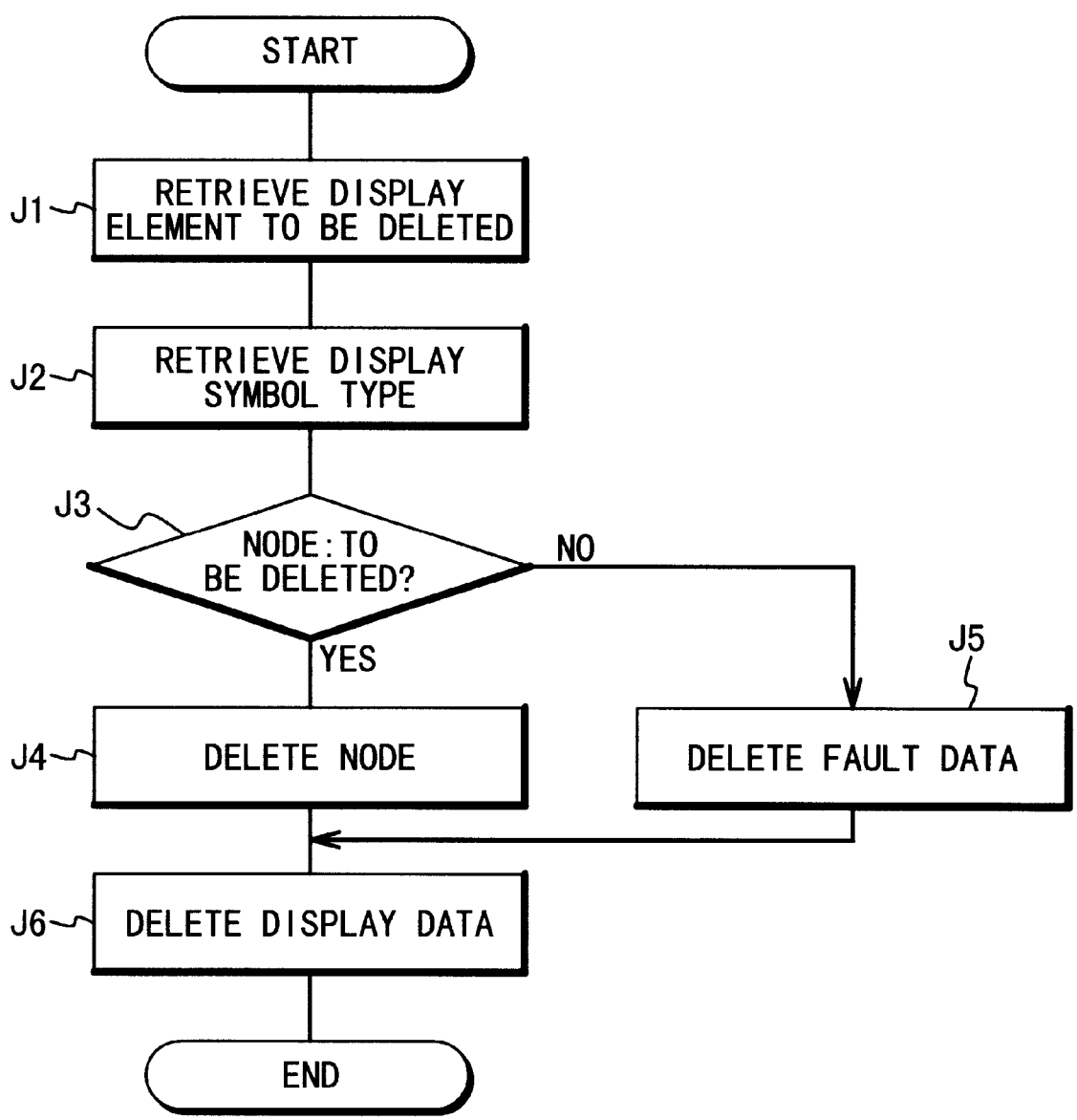
FIG. 17 is a flow chart showing a deletion processing operation of a fault data in the second embodiment.

Referring to FIG. 17, when the fault data deleting section 27 deletes the fault data or the fault node data deleting section 28 deletes the fault node data, the fault data display control unit 29 is supplied with the addresses of the display data related with the fault node data and the fault data to be deleted.

The fault data display control unit 29 accesses the display data storage section 34 based on the address of the supplied display data display data to acquire the display data to be deleted (Step J1 of FIG. 17). Subsequently, the fault data display control unit 29 extracts a data of the display symbol from the display data to check whether the object to be deleted is the fault data or a fault node data, based on the extracted data (Step J2).

When the object to be deleted is a node, i.e., in case of "YES" at a step J3, the fault data display control unit 29 outputs a request to the output unit 1 to delete the node (Step J4). When the object to be deleted is a fault data, i.e., in case of "NO" at a step J3, the fault data display control unit 29 outputs a request to the output unit 1 to delete the fault data (Step J5).

Lastly, the fault data display control unit 29 deletes the display data from the display data storage section 34 (Step J6).

It should be noted that in the embodiments to have described above, the present invention is structured in the specific condition but the present invention is not limited to this and may be applied with various changes.

As described above in detail, according to the present invention, the fault occurrence location data and the fault data in the network are managed in the tree structure. Therefore, these data can be hierarchically displayed. As a result, the operator can easily grasp a fault occurrence location and a fault state in the network.

What is claimed is:

1. A method of managing faults on a network including network elements as nodes, comprising:

receiving a fault association data having a fault occurrence position identifier and a fault data, said fault occurrence position identifier indicating a fault node in which a fault has occurred, and said fault data indicating a data associated with said fault;

determining whether any fault node indication data corresponding to said fault node specified by said fault occurrence position identifier of said fault association data is present in a fault node indication data set in a tree form;

generating a fault node indication data based on said fault occurrence position identifier to add to said fault node indication data set in the tree form, when any fault node indication data corresponding to said fault node specified by said fault occurrence position identifier is not present in a fault node indication data set;

determining whether any fault indication data corresponding to said fault node indication data is present in a fault indication data set, said fault indication data indicating a type of said fault;

generating a fault indication data corresponding to said fault node indication data based on said fault data to add to said fault indication data set, when said fault indication data corresponding to said fault node indication data is not present in said fault indication data set; and displaying said fault node indication data set in the tree form and said fault indication data set in response to said fault association data or a display instruction.

2. A method of managing fault on a network according to claim 1, wherein said fault data of said fault association data includes a restoration data indicating that said fault has been restored, and wherein said method further comprises:

deleting said fault node indication data corresponding to said fault association data from said fault node indication data set and said fault indication data corresponding to said fault association data from said fault indication data set in response to said restoration data of said fault association data.

3. A method of managing fault on a network according to claim 2, wherein said fault data of said fault association data includes an fault importance level indicating whether said fault is important, and said fault indication data includes a fault importance indication data, and wherein said method further comprises:

updating said fault importance indication data of said fault indication data corresponding to said fault node specified by said fault occurrence position identifier of said fault association data based on said fault importance level, when said fault node indication data and said fault indication data are not generated and said fault data of said fault association data does not include said restoration data.

4. A method of managing fault on a network according to claim 1, wherein said generating a fault node indication data further includes:

generating a first display indication data corresponding to said fault node specified by said fault occurrence position identifier, said first display indication data including a symbol, and wherein said generating a fault indication data further includes:

generating a second display indication data for said fault indication data corresponding to said fault node specified by said fault occurrence position identifier, said second display indication data including a character string, and wherein said displaying includes:

displaying said fault node indication data set in the tree form and said fault indication data set based on said first and second display indication data in response to said fault association data or said display instruction.

5. A method of managing fault on a network according to claim 2, wherein said generating a fault node indication data further includes:

generating a first display indication data corresponding to said fault node specified by said fault occurrence position identifier, said first display indication data including a symbol, and wherein said generating a fault indication data further includes:

generating a second display indication data for said fault indication data corresponding to said fault node specified by said fault occurrence position identifier, said second display indication data including a character string, wherein said deleting further includes:

deleting said first and second display indication data respectively corresponding to said fault node indication data and said fault indication data, and wherein said displaying includes:

displaying said fault node indication data set in said tree form and said fault indication data set based on said first and second display indication data in response to said fault association data or said display instruction; and displaying said fault node indication data set in said tree form of said fault nodes from which said fault node is deleted.

6. A method of managing fault on a network according to claim 3, wherein said generating said fault node indication data further includes:

generating a first display indication data corresponding to said fault node specified by said fault occurrence position identifier, said first display indication data including a symbol, and wherein said generating said fault indication data further includes:

generating a second display indication data for said fault indication data corresponding to said fault node specified by said fault occurrence position identifier, said second display indication data including a character string, wherein said updating further includes:

updating said second display indication data corresponding to said fault node specified by said fault occurrence position identifier of said fault association data based on said fault importance level, when said fault node indication data and said fault indication data are not generated and said fault indication data of said fault association data does not include said restoration data; and wherein said displaying includes:

displaying said tree form of said fault nodes and said data associated with said fault based on said first and second display indication data in response to said fault association data or said display instruction; and displaying said tree form of said fault nodes in one of which said fault importance level is updated.

7. A method of managing fault on a network according to claim 1, wherein said fault node indication data of said fault node has an address to a list of parent node addresses corresponding to a parent node, an address to a list of child node addresses which designate child nodes connected to said fault node, and a list of fault indication data addresses which designate said fault indication data.

8. A method of managing fault on a network according to claim 1, wherein said generating said fault node indication data includes:

setting a new data generation flag when said fault node indication data is generated, and wherein said determining whether a fault indication data corresponding to said fault node indication data is present in a fault indication data set includes:

checking said new data generation flag to determine whether a fault indication data corresponding to said fault node indication data is present in a fault indication data set.

9. A network fault managing system for a network including network elements as nodes, comprising:
   a fault node indication data storage section storing a fault node indication data set in which fault nodes are managed in a tree form;
   a fault indication data storage section;
   a flag;
   a fault node indication data processing section which:
      receives a fault association data having a fault occurrence position identifier and a fault indication data, said fault occurrence position identifier indicating a fault node in which a fault has occurred, and said fault indication data indicating data associated with said fault,
      determines whether a fault node indication data corresponding to said fault node specified by said fault occurrence position identifier of said fault association data is present in said fault node indication data set,
      generates said fault node indication data based on said fault occurrence position identifier to store in said fault node indication data set of said fault node indication data storage section, when said fault node indication data is not present in said fault node indication data set, and
      sets said flag;
   a fault indication data processing section which:
      determines based on said flag, whether a fault indication data corresponding to said fault node indication data is present in a fault indication data set, said fault indication data indicating a type of said fault, and
      generates said fault indication data based on said fault indication data to store in fault indication data set of said fault indication data set, when said fault indication data corresponding to said fault node indication data is not present in said fault indication data set; and
   an output unit outputting said fault node indication data set in the tree form and at least a part of said fault indication data set.

10. A network fault managing system according to claim 9, wherein said fault indication data of said fault association data includes a restoration data indicating that said fault has been restored, and
   wherein said fault node indication data processing section deletes said fault node indication data from said fault node indication data set in response to said restoration data of said fault association data, and
   wherein said fault indication data processing section deletes said fault indication data from said fault indication data set in response to said restoration data of said fault association data.

11. A network fault managing system according to claim 10, wherein said fault indication data of said fault association data includes an fault importance level indicating whether said fault is important, and said fault indication data includes a fault importance indication data, and
   wherein said fault indication data processing section updates said fault importance indication data of said fault indication data corresponding to said fault node specified by said fault occurrence position identifier of said fault association data based on said fault importance level, when said fault node indication data and said fault indication data are not generated and said fault indication data of said fault association data does not include said restoration data.

12. A network fault managing system according to claim 9, wherein said fault node indication data processing section generates a first display indication data corresponding to said fault node specified by said fault occurrence position identifier, said first display indication data including a symbol, and
   wherein said fault indication data processing section generates a second display indication data for said fault indication data corresponding to said fault node specified by said fault occurrence position identifier, said second display indication data including a character string, and
   wherein said output unit outputs said tree form of said fault nodes and a data associated with said fault based on said first and second display indication data in response to said fault association data or said display instruction.

13. A network fault managing system according to claim 10, wherein said fault node indication data processing section:
   generates a first display indication data corresponding to said fault node specified by said fault occurrence position identifier, said first display indication data including a symbol, and
   deletes said first and second display indication data respectively corresponding to said fault node indication data,
   wherein said fault indication data processing section:
      generates a second display indication data for said fault indication data corresponding to said fault node specified by said fault occurrence position identifier, said second display indication data including a character string, deleting said first and second display indication data respectively corresponding to said fault node indication data and said fault indication data, and
      deletes said fault indication data corresponding to said fault node indication data,
   wherein said output unit:
      outputs said tree form of said fault nodes and a data associated with said fault based on said first and second display indication data in response to said fault association data or said display instruction; and
      outputs said tree form of said fault nodes from which said fault node is deleted.

14. A network fault managing system according to claim 11, wherein said fault node indication data processing section generates a first display indication data corresponding to said fault node specified by said fault occurrence position identifier, said first display indication data including a symbol, and
   wherein said fault indication data processing section:
      generates a second display indication data for said fault indication data corresponding to said fault node specified by said fault occurrence position identifier, said second display indication data including a character string,
      updates said second display indication data corresponding to said fault node specified by said fault occurrence position identifier of said fault association data based on said fault importance level, when said fault node indication data and said fault indication data are not generated and said fault indication data of said fault association data does not include said restoration data; and wherein said output unit:
outputs said tree form of said fault nodes and said data associated with said fault based on said first and second display indication data in response to said fault association data or said display instruction; and
outputs said tree form of said fault nodes in one of which said fault importance level is updated.

15. A network fault managing system according to claim 9, wherein said fault node indication data of said fault node has an address of a list of parent node addresses corresponding to a parent node, an address to a list of child node addresses which designate child nodes connected to said fault node, and a list of fault indication data addresses which designate said fault indication data.

16. A computer-readable recording medium in which a program is stored to execute a method of managing faults on a network including network elements as nodes, comprising:
receiving a fault association data having a fault occurrence position identifier and a fault data, said fault occurrence position identifier indicating a fault node in which a fault has occurred, and said fault data indicating a data associated with said fault;
determining whether any fault node indication data corresponding to said fault node specified by said fault occurrence position identifier of said fault association data is present in a fault node indication data set in a tree form;
generating a fault node indication data based on said fault occurrence position identifier to add to said fault node indication data set in the tee form, when any fault node indication data corresponding to said fault node specified by said fault occurrence position identifier is not present in a fault node indication data set;
determining whether any fault indication data corresponding to said fault node indication data is present in a fault indication data set, said fault indication data indicating a type of said fault;
generating a fault indication data corresponding to said fault node indication data based on said fault data to add to said fault indication data set, when said fault indication data corresponding to said fault node indication data is not present in said fault indication data set; and
displaying said fault node indication data set in the tree form and said fault indication data set in response to said fault association data or a display instruction.

17. A computer-readable recording medium according to claim 16, wherein said fault data of said fault association data includes a restoration data indicating that said fault has been restored, and wherein said method further comprises:
deleting said fault node indication data corresponding to said fault association data from said fault node indication data set and said fault indication data corresponding to said fault association data from said fault indication data set in response to said restoration data of said fault association data.

18. A computer-readable recording medium according to claim 17, wherein said fault data of said fault association data includes an fault importance level indicating whether said fault is important, and said fault indication data includes a fault importance indication data, and wherein said method further comprises:
updating said fault importance indication data of said fault indication data corresponding to said fault node specified by said fault occurrence position identifier of said fault association data based on said fault importance level, when said fault node indication data and said fault indication data are not generated and said fault data of said fault association data does not include said restoration data.

19. A computer-readable recording medium according to claim 16, wherein said generating a fault node indication data further includes:
generating a first display indication data corresponding to said fault node specified by said fault occurrence position identifier, said first display indication data including a symbol, and wherein said generating a fault indication data further includes:
generating a second display indication data for said fault indication data corresponding to said fault node specified by said fault occurrence position identifier, said second display indication data including a character string, and wherein said displaying includes:
displaying said fault node indication data set in the tree form and said fault indication data set based on said first and second display indication data in response to said fault association data or said display instruction.

20. A computer-readable recording medium according to claim 17, wherein said generating a fault node indication data further includes:
generating a first display indication data corresponding to said fault node specified by said fault occurrence position identifier, said first display indication data including a symbol, and wherein said generating a fault indication data further includes:
generating a second display indication data for said fault indication data corresponding to said fault node specified by said fault occurrence position identifier, said second display indication data including a character string, wherein said deleting further includes:
deleting said first and second display indication data respectively corresponding to said fault node indication data and said fault indication data, and wherein said displaying includes:
displaying said fault node indication data set in said tree form and said fault indication data set based on said first and second display indication data in response to said fault association data or said display instruction; and
displaying said fault node indication data set in said tree form of said fault nodes from which said fault node is deleted.

21. A computer-readable recording medium according to claim 18, wherein said generating said fault node indication data further includes:
generating a first display indication data corresponding to said fault node specified by said fault occurrence position identifier, said first display indication data including a symbol, and wherein said generating said fault indication data further includes:
generating a second display indication data for said fault indication data corresponding to said fault node specified by said fault occurrence position identifier, said second display indication data including a character string, wherein said updating further includes:
    updating said second display indication data corresponding to said fault node specified by said fault occurrence position identifier of said fault association data based on said fault importance level, when said fault node indication data and said fault indication data are not generated and said fault indication data of said fault association data does not include said restoration data; and wherein said displaying includes:
    displaying said tree form of said fault nodes and said data associated with said fault based on said first and second display indication data in response to said fault association data or said display instruction; and
    displaying said tree form of said fault nodes in one of which said fault importance level is updated.

22. A computer-readable recording medium according to claim 16, wherein said fault node indication data of said fault node has an address to a list of parent node addresses corresponding to a parent node, an address to a list of child node addresses which designate child nodes connected to said fault node, and a list of fault indication data addresses which designate said fault indication data.

23. A computer-readable recording medium according to claim 16, wherein said generating said fault node indication data includes:

setting a new data generation flag when said fault node indication data is generated, and wherein said determining whether a fault indication data corresponding to said fault node indication data is present in a fault indication data set includes:
        checking said new data generation flag to determine whether a fault indication data corresponding to said fault node indication data is present in a fault indication data set.

\* \* \* \* \*

UNITED STATES PATENT AND TRADEMARK OFFICE
CERTIFICATE OF CORRECTION

PATENT NO. : 6,499,117 B1
DATED : December 24, 2002
INVENTOR(S) : Katsuyuki Tanaka It is certified that error appears in the above-identified patent and that said Letters Patent is hereby corrected as shown below:

<u>Title page,</u>
Item [57], ABSTRACT,
Line 23, after "sets the flag."; insert:

-- The fault indication data processing section determines based on the flag, whether a fault indication data corresponding to the fault node indication data is present in a fault indication data set, the fault indication data indicating a type of the fault, and generates the fault indication data based on the fault indication data to store in fault indication data set of the fault indication data set, when the fault indication data corresponding to the fault node indication data is not present in the fault indication data set. The output unit outputs the fault node indication data set in the tree form and at least a part of the fault indication data set. --

Signed and Sealed this

Seventeenth Day of August, 2004

JON W. DUDAS
*Acting Director of the United States Patent and Trademark Office*